United States Patent
Li et al.

(10) Patent No.: US 10,743,146 B2
(45) Date of Patent: Aug. 11, 2020

(54) MULTICAST SERVICE READING AND SENDING METHOD, AND RELATED DEVICE

(71) Applicant: HUAWEI TECHNOLOGIES CO., LTD., Shenzhen, Guangdong (CN)

(72) Inventors: Bingzhao Li, Beijing (CN); Yongqiang Gao, Beijing (CN); Jian Zhang, Beijing (CN); Wei Quan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/896,211

(22) Filed: Feb. 14, 2018

(65) Prior Publication Data
US 2018/0176744 A1 Jun. 21, 2018

Related U.S. Application Data

(63) Continuation of application No. PCT/CN2016/072794, filed on Jan. 29, 2016.

(30) Foreign Application Priority Data

Aug. 14, 2015 (WO) ............... PCT/CN2015/087114

(51) Int. Cl.
*H04W 4/06* (2009.01)
*H04L 1/18* (2006.01)
(Continued)

(52) U.S. Cl.
CPC ............ *H04W 4/06* (2013.01); *H04L 1/1887* (2013.01); *H04W 72/005* (2013.01); *H04W 72/0446* (2013.01); *H04W 72/1205* (2013.01)

(58) Field of Classification Search
CPC . H04W 4/06; H04W 72/005; H04W 72/0446; H04W 72/1205; H04L 1/1887
(Continued)

(56) References Cited

U.S. PATENT DOCUMENTS

2010/0189026 A1 7/2010 Lee et al.
2010/0272004 A1* 10/2010 Maeda ............... H04L 5/0007
370/312
(Continued)

FOREIGN PATENT DOCUMENTS

CN 101808281 A 8/2010
CN 101841773 A 9/2010
(Continued)

OTHER PUBLICATIONS

3GPP TS 36.331 V12.6.0 (Jun. 2015);3rd Generation Partnership Project;Technical Specification Group Radio Access Network;Evolved Universal Terrestrial Radio Access (E-UTRA);Radio Resource Control (RRC);Protocol specification (Release 12),total 449 pages.
(Continued)

*Primary Examiner* — Ivan O Latorre
(74) *Attorney, Agent, or Firm* — Gregg L. Jansen

(57) ABSTRACT

The present disclosure discloses a multicast service reading method. The method includes: determining, by user equipment UE, multicast control channel MCCH configuration information, where the MCCH configuration information includes a multicast control channel identifier MCCH-RNTI and MCCH sending period information; determining, by the UE, MCCH sending time information according to the MCCH sending period information; reading, by the UE, an MCCH message according to the MCCH sending time information by using the MCCH-RNTI, where the MCCH message includes configuration information of a multicast service; and reading, by the UE, the multicast service according to the configuration information of the multicast service. Embodiments of the present disclosure further provide a multicast service sending method and a related device. The embodiments of the present disclosure help reduce waste of an MBSFN subframe.

14 Claims, 8 Drawing Sheets

(51) Int. Cl.
*H04W 72/00* (2009.01)
*H04W 72/04* (2009.01)
*H04W 72/12* (2009.01)

(58) Field of Classification Search
IPC .............................. H04W 4/06; H04L 1/1887
See application file for complete search history.

(56) References Cited

U.S. PATENT DOCUMENTS

| | | | |
|---|---|---|---|
| 2010/0322135 A1* | 12/2010 | Van Lieshout | H04W 72/005 370/312 |
| 2011/0103288 A1 | 5/2011 | Lee et al. | |
| 2011/0305186 A1 | 12/2011 | Gou et al. | |
| 2012/0008543 A1 | 1/2012 | Gou et al. | |
| 2012/0093051 A1 | 4/2012 | Xu | |
| 2012/0230347 A1 | 9/2012 | Gao et al. | |
| 2013/0003640 A1* | 1/2013 | Yang | H04W 72/005 370/312 |
| 2014/0362756 A1 | 12/2014 | Maeda et al. | |
| 2014/0376438 A1 | 12/2014 | Damnjanovic et al. | |
| 2016/0338011 A1 | 11/2016 | Mizusawa et al. | |
| 2016/0381588 A1* | 12/2016 | Strobl | H04W 24/10 455/67.11 |
| 2018/0176893 A1* | 6/2018 | Zhang | H04W 4/06 |

FOREIGN PATENT DOCUMENTS

| | | |
|---|---|---|
| CN | 101873528 A | 10/2010 |
| CN | 101931879 A | 12/2010 |
| CN | 101990160 A | 3/2011 |
| CN | 102638767 A | 8/2012 |
| EP | 2830237 A1 | 1/2015 |
| JP | 2012523725 A | 10/2012 |
| JP | 2015142225 A | 8/2015 |
| KR | 20110133486 A | 12/2011 |

OTHER PUBLICATIONS

3GPP TS 36.300 V13.0.0 (Jun. 2015);3rd Generation Partnership Project;Technical Specification Group Radio Access Network;Evolved Universal Terrestrial Radio Access (E-UTRA) and Evolved Universal Terrestrial Radio Access Network (E-UTRAN);Overall description;Stage 2(Release 13),total 254 pages.
3GPP TS 36.443 V13.0.0 (Jun. 2015);3rd Generation Partnership Project;Technical Specification Group Radio Access Network;Evolved Universal Terrestrial Radio Access Network (E-UTRAN);M2 Application Protocol (M2AP)(Release 13),total 89 pages.
3GPP TSG-RAN WG2 #59 R2-073509,"Discussion on MCCH Update",LG Electronics Inc., Aug. 20-24, 2007, total 2 pages.
Ericsson, ST-Ericsson, Subframe allocation for eMBMS[online], 3GPP TSG-RAN WG2#67bis R2-096041, Internet URL:http://www.3gpp.org/ftp/tsg_ran/WG2_RL2/TSGR2_67bis/Docs/R2-096041.zip>, Oct. 12, 2009,total 5 pages.
Ericsson, MCCH change notification for 1.4 MHz[online], 3GPP TSG-RAN WG2#90 R2-152586, Internet URL:http://www.3gpp.org/ftp/tsg_ran/WG2_RL2/TSGR2_90/Docs/R2-152586.zip>, May 25, 2015,total 3 pages.

* cited by examiner

_(10) Patent No.: US 10,743,146 B2_

MULTICAST SERVICE READING AND SENDING METHOD, AND RELATED DEVICE

CROSS REFERENCE

This disclosure is a continuation of International Application No. PCT/CN2016/072794, filed on Jan. 29, 2016, which claims priority to International Patent Disclosure No. PCT/CN2015/087114, filed with the International Patent Office on Aug. 14, 2015, all of which are incorporated herein by reference in their entireties.

TECHNICAL FIELD

The present disclosure relates to the field of mobile communications technologies, and in particular, to a multicast service reading and sending method, and a related device.

BACKGROUND

An MBMS (multimedia broadcast multicast service) mechanism which is introduced into an LTE (Long Term Evolution) system, is also referred to as an eMBMS (evolved MBMS) mechanism. Control information of an MBMS is transmitted on an MCCH (multicast control channel), and MCS (modulation and coding scheme) information of the MCCH is transmitted on a BCCH (broadcast control channel).

Related logical channels of the MBMS include: a BCCH, an MCCH, and an MTCH (MBMS point-to-multipoint Control Channel). The BCCH is configured to broadcast, by a network, system information to UE (user equipment). The MCCH is configured to transmit, by the network, MBMS-related control information to the UE. One MCCH may correspond to one or more MTCHs. Only UE that can read an MBMS service can use the MCCH. A base station notifies, by means of a system broadcast, the UE of an MCS of the MCCH and period information of the MCCH (the period information of the MCCH includes a modification period (MP) and a repetition period (RP)). The MTCH is a point-to-multipoint downlink channel, and is configured to transmit, by the network, MBMS service data to the UE. Only UE that can read an MBMS service can use the MTCH. Information about the MTCH is indicated by an MCCH corresponding to the MTCH. The network indicates the MCCH to the UE by using the BCCH, and then indicates the MTCH to the UE by using the MCCH, so that the UE reads an MBMS service carried on the MTCH.

At present, in an MBMS system, an MCCH message can be sent only by using an MBSFN (multimedia broadcast multicast service single frequency network) subframe. The MBSFN subframe is a dedicated subframe and can be used to send only one data block. UE can obtain the MCCH message by reading the MBSFN subframe at a corresponding time point. The MBSFN subframe can be used to transmit only one data block, and one data block can be used to transmit the MCCH message or transmit other data than the MCCH message. However, if the MCCH message cannot fully occupy all resources in the MBSFN subframe, other data cannot be sent in the MBSFN subframe either, resulting in resource waste.

SUMMARY

Embodiments of the present disclosure provide a multicast service reading and sending method, and a related device, so as to reduce waste of an MBSFN subframe.

According to a first aspect, an embodiment of the present disclosure provides a multicast service reading method, including:

determining, by user equipment UE, multicast control channel MCCH configuration information, where the MCCH configuration information includes a multicast control channel-radio network temporary identifier MCCH-RNTI and MCCH sending period information;

determining, by the UE, MCCH sending time information according to the MCCH sending period information;

reading, by the UE, an MCCH message according to the MCCH sending time information by using the MCCH-RNTI, where the MCCH message includes configuration information of a multicast service; and reading, by the UE, the multicast service according to the configuration information of the multicast service.

With reference to the first aspect, in a first possible implementation of the first aspect, the MCCH sending period information includes an MCCH repetition period and an offset parameter for sending an MCCH; and the determining, by the UE, MCCH sending time information according to the MCCH sending period information includes:

determining, by the UE according to the MCCH repetition period and the offset parameter for sending the MCCH, a subframe location corresponding to a time of sending the MCCH.

With reference to the first possible implementation of the first aspect, in a second possible implementation of the first aspect, if in each MCCH repetition period, there is only one subframe for sending the MCCH, the determining, by the UE according to the MCCH repetition period and the offset parameter for sending the MCCH, a subframe location corresponding to a time of sending the MCCH includes:

determining, by the UE according to a system frame number, a subframe number, the MCCH repetition period, and the offset parameter for sending the MCCH, the subframe location corresponding to the time of sending the MCCH.

With reference to the first possible implementation of the first aspect, in a third possible implementation of the first aspect, if in each MCCH repetition period, there are multiple candidate subframes for sending the MCCH, the determining, by the UE according to the MCCH repetition period and the offset parameter for sending the MCCH, a subframe location corresponding to a time of sending the MCCH includes:

determining, by the UE according to a system frame number, the MCCH repetition period, and the offset parameter of the MCCH, a subframe location set corresponding to the time of sending the MCCH.

With reference to the first possible implementation of the first aspect, in a fourth possible implementation of the first aspect, the determining, by the UE according to the MCCH repetition period and the offset parameter for sending the MCCH, a subframe location corresponding to a time of sending the MCCH includes:

determining, by the UE according to a system frame number, the MCCH repetition period, and the offset parameter of the MCCH, a frame for sending the MCCH; and determining, by the UE according to MCCH subframe set configuration information and the frame for sending the MCCH, a subframe location set corresponding to the MCCH sending time information.

With reference to the fourth possible implementation of the first aspect, in a fifth possible implementation of the first aspect, the MCCH subframe set configuration information is carried in MCCH configuration signaling that is sent by the base station to the UE, and the MCCH configuration signaling is a system broadcast message or dedicated signaling of the UE.

With reference to the fourth or the fifth possible implementation of the first aspect, in a sixth possible implementation of the first aspect, the MCCH subframe set configuration information includes an MCCH subframe sequence; or the MCCH subframe set configuration information includes an MCCH subframe starting location; or the MCCH subframe set configuration information includes the MCCH subframe starting location and sending duration information.

With reference to the sixth possible implementation of the first aspect, in a seventh possible implementation of the first aspect, the MCCH subframe sequence is a bitmap sequence, and the determining, by the UE according to MCCH subframe set configuration information and the frame for sending the MCCH, a subframe location set corresponding to the MCCH sending time information includes:

determining, by the UE according to the frame for sending the MCCH, a value of each bit in the bitmap sequence, and a subframe number corresponding to each bit in the bitmap sequence, the subframe location set corresponding to the MCCH sending time information.

With reference to the sixth possible implementation of the first aspect, in an eighth possible implementation of the first aspect, the MCCH subframe set configuration information includes the MCCH subframe starting location, the subframe location set corresponding to the MCCH sending time information includes one subframe, and the subframe is a subframe corresponding to the MCCH subframe starting location.

With reference to the sixth possible implementation of the first aspect, in a ninth possible implementation of the first aspect, the MCCH subframe set configuration information includes the MCCH subframe starting location and the sending duration information, and the determining, by the UE according to MCCH subframe set configuration information and the frame for sending the MCCH, a subframe location set corresponding to the MCCH sending time information includes:

determining, by the UE according to the sending duration information, a total quantity of subframes for sending the MCCH; and determining, by the UE according to the total quantity of subframes for sending the MCCH and a starting subframe for sending the MCCH, all subframes for sending the MCCH; or determining, by the UE according to the total quantity of subframes for sending the MCCH, a starting subframe for sending the MCCH, and the MBSFN subframe configuration, all subframes for sending the MCCH.

With reference to any one of the fourth to the ninth possible implementations of the first aspect, in a tenth possible implementation of the first aspect, the method further includes:

determining, by the UE, the starting subframe according to the MCCH subframe set configuration information, and using the starting subframe as a subframe of an MCCH change notification; or determining, by the UE according to the MCCH subframe set configuration information, all the subframes for sending the MCCH, and using any subframe in all the subframes for sending the MCCH as a subframe of an MCCH change notification.

With reference to any one of the first to the tenth possible implementations of the first aspect, in an eleventh possible implementation of the first aspect, the reading, by the UE, an MCCH message according to the MCCH sending time information by using the MCCH-RNTI includes:

reading, by the UE by using the MCCH-RNTI, a physical downlink control channel PDCCH or an enhanced physical downlink control channel EPDCCH in the subframe location corresponding to the time of sending the MCCH; and reading, by the UE, the MCCH message in a specified MCCH message resource location on the PDCCH or the EPDCCH.

With reference to any one of the first aspect or the first to the eleventh possible implementations of the first aspect, in a twelfth possible implementation of the first aspect, the configuration information of the multicast service includes a temporary multicast group identifier and a G-RNTI for scheduling the multicast service, and the reading, by the UE, the multicast service according to the configuration information of the multicast service includes:

reading, by the UE according to the G-RNTI for scheduling the multicast service, the multicast service corresponding to the temporary multicast group identifier.

With reference to the twelfth possible implementation of the first aspect, in a thirteenth possible implementation of the first aspect, the reading, by the UE according to the G-RNTI for scheduling the multicast service, the multicast service corresponding to the temporary multicast group identifier includes:

reading, by the UE, PDCCH scheduling information according to the G-RNTI of the multicast service; and determining, by the UE according to the PDCCH scheduling information, a frequency resource and a modulation scheme that are corresponding to the multicast service corresponding to the temporary multicast group identifier, and reading the multicast service according to the frequency resource and the modulation scheme.

With reference to any one of the first aspect or the first to the eleventh possible implementations of the first aspect, in a fourteenth possible implementation of the first aspect, the configuration information of the multicast service includes a temporary multicast group identifier and scheduling information of the multicast service, and the scheduling information of the multicast service includes a frequency resource and a modulation scheme that are used to read the multicast service, and the reading, by the UE, the multicast service according to the configuration information of the multicast service includes:

reading, by the UE according to the frequency resource and the modulation scheme of the multicast service, the multicast service corresponding to the temporary multicast group identifier.

With reference to any one of the first aspect or the first to the fourteenth possible implementations of the first aspect, in a fifteenth possible implementation of the first aspect, after the determining, by UE, MCCH configuration information, the method further includes:

determining, by the UE, whether the MCCH changes; and if the UE determines that the MCCH changes, re-reading, by the UE, the MCCH message according to the MCCH configuration information.

With reference to the fifteenth possible implementation of the first aspect, in a sixteenth possible implementation of the first aspect, the determining, by the UE, whether the MCCH changes includes:

determining, by the UE, an MCCH modification period of the MCCH;

reading, by the UE, the PDCCH or the EPDCCH in the MCCH modification period according to the MCCH-RNTI, to obtain an MCCH change identifier on the PDCCH or the EPDCCH, where the change identifier includes any one of the following change identifiers: a change identifier in a change identifier field of the PDCCH or the EPDCCH, an NDI, a process number, or a combination of an NDI and a process number; and if the MCCH change identifier is different from a change identifier in a previous modification period, determining, by the UE, that the MCCH changes; or if the MCCH change identifier is the same as a first preset value, determining, by the UE, that the MCCH changes.

With reference to the fifteenth possible implementation of the first aspect, in a seventeenth possible implementation of the first aspect, the determining, by the UE, whether the MCCH changes includes:

determining, by the UE, an MCCH modification period of the MCCH and an M-RNTI corresponding to the MCCH modification period;

reading, by the UE in a non-MBSFN subframe, a change notification field included on a PDCCH corresponding to the M-RNTI; and if a bit value corresponding to the MCCH in the change notification field is the same as a second preset value, determining, by the UE, that the MCCH changes.

With reference to any one of the fifteenth to the seventeenth possible implementations of the first aspect, in an eighteenth possible implementation of the first aspect, the re-reading, by the UE, the MCCH message according to the MCCH configuration information includes:

re-reading, by the UE according to the MCCH configuration information, the MCCH message in a current MCCH modification period in which it is determined that the MCCH changes; or re-reading, by the UE according to the MCCH configuration information, the MCCH message in a next MCCH modification period of a current MCCH modification period in which it is determined that the MCCH changes.

With reference to the sixteenth or the seventeenth possible implementation of the first aspect, in a nineteenth possible implementation of the first aspect, the determining, by the UE, an MCCH modification period of the MCCH includes:

if the MCCH sending period information includes only one MCCH modification period, determining, by the UE, the MCCH modification period as the MCCH modification period; or if the MCCH sending period information includes multiple MCCH modification periods and each MCCH modification period has a period selection parameter corresponding to the MCCH modification period, determining, by the UE, the MCCH modification period according to the MCCH period selection parameter and a multicast service that needs to be read by the UE; or if the MCCH configuration information includes multiple MCCHs, each MCCH has multiple MCCH modification periods, and each MCCH has an MCCH selection parameter corresponding to the MCCH, determining, by the UE according to the MCCH selection parameter and a multicast service that needs to be read by the UE, an MCCH that needs to be read; and determining, by the UE, the MCCH modification period according to an MCCH period selection parameter and the multicast service that needs to be read by the UE.

With reference to any one of the first aspect or the first to the nineteenth possible implementations of the first aspect, in a twentieth possible implementation of the first aspect, the MCCH configuration information includes at least one of pre-defined configuration information or configuration information that is sent by the base station to the UE by using a system broadcast message.

According to a second aspect, an embodiment of the present disclosure provides a multicast service sending method, including:

determining, by a base station, MCCH configuration information, where the MCCH configuration information includes an MCCH-RNTI and MCCH sending period information;

determining, by the base station, MCCH sending time information according to the MCCH sending period information;

sending, by the base station, an MCCH message according to the MCCH sending time information by using the MCCH-RNTI, where the MCCH message includes configuration information of a multicast service; and sending, by the base station, the multicast service according to the configuration information of the multicast service.

With reference to the second aspect, in a first possible implementation of the second aspect, the MCCH sending period information includes an MCCH repetition period and an offset parameter for sending an MCCH; and the determining, by the base station, MCCH sending time information according to the MCCH sending period information includes:

determining, by the base station according to the MCCH repetition period and the offset parameter for sending the MCCH, a subframe location corresponding to a time of sending the MCCH.

With reference to the first possible implementation of the second aspect, in a second possible implementation of the second aspect, if in each MCCH repetition period, there is only one subframe for sending the MCCH, the determining, by the base station according to the MCCH repetition period and the offset parameter for sending the MCCH, a subframe location corresponding to a time of sending the MCCH includes:

determining, by the base station according to a system frame number, a subframe number, the MCCH repetition period, and the offset parameter for sending the MCCH, the subframe location corresponding to the time of sending the MCCH.

With reference to the first possible implementation of the second aspect, in a third possible implementation of the second aspect, if in each MCCH repetition period, there are multiple candidate subframes for sending the MCCH, the determining, by the base station according to the MCCH repetition period and the offset parameter for sending the MCCH, a subframe location corresponding to a time of sending the MCCH includes:

determining, by the base station according to a system frame number, the MCCH repetition period, and the offset parameter of the MCCH, a subframe location set corresponding to the time of sending the MCCH.

With reference to the first possible implementation of the second aspect, in a fourth possible implementation of the second aspect, the determining, by the base station according to the MCCH repetition period and the offset parameter for sending the MCCH, a subframe location corresponding to a time of sending the MCCH includes:

determining, by the base station according to a system frame number, the MCCH repetition period, and the offset parameter of the MCCH, a frame for sending the MCCH; and determining, by the base station according to MCCH subframe set configuration information and the frame for sending the MCCH, a subframe location set corresponding to the MCCH sending time information.

With reference to the fourth possible implementation of the second aspect, in a fifth possible implementation of the second aspect, the MCCH subframe set configuration information includes an MCCH subframe sequence; or the MCCH subframe set configuration information includes an MCCH subframe starting location; or the MCCH subframe set configuration information includes the MCCH subframe starting location and sending duration information.

With reference to the fourth possible implementation of the second aspect, in a sixth possible implementation of the second aspect, the MCCH subframe set configuration information is determined by the base station according to subframe information of a to-be-sent MCCH, where the subframe information of the to-be-sent MCCH includes a subframe location of the to-be-sent MCCH, the MCCH subframe set configuration information includes an MCCH subframe sequence, and the MCCH subframe sequence is determined by the base station according to the subframe location of the to-be-sent MCCH; or the subframe information of the to-be-sent MCCH includes a quantity of subframes of the to-be-sent MCCH, and if there is one subframe of the to-be-sent MCCH, the MCCH subframe set configuration information includes an MCCH subframe starting location, or if there are multiple subframes of the to-be-sent MCCH, the MCCH subframe set configuration information includes an MCCH subframe starting location and sending duration information.

With reference to the sixth possible implementation of the second aspect, in a seventh possible implementation of the second aspect, the MCCH subframe sequence is a bitmap sequence, and the determining, by the base station according to MCCH subframe set configuration information and the frame for sending the MCCH, a subframe location set corresponding to the MCCH sending time information includes:

determining, by the base station according to the frame for sending the MCCH, a value of each bit in the bitmap sequence, and a subframe number corresponding to each bit in the bitmap sequence, the subframe location set corresponding to the MCCH sending time information.

With reference to the sixth possible implementation of the second aspect, in an eighth possible implementation of the second aspect, the MCCH subframe set configuration information includes the MCCH subframe starting location, the subframe location set corresponding to the MCCH sending time information includes one subframe, and the subframe is a subframe corresponding to the MCCH subframe starting location.

With reference to the sixth possible implementation of the second aspect, in a ninth possible implementation of the second aspect, the MCCH subframe set configuration information includes the MCCH subframe starting location and the sending duration information, and the determining, by the base station according to MCCH subframe set configuration information and the frame for sending the MCCH, a subframe location set corresponding to the MCCH sending time information includes:

determining, by the base station according to the sending duration information, a total quantity of subframes for sending the MCCH; and determining, by the base station according to the total quantity of subframes for sending the MCCH and a starting subframe for sending the MCCH, all subframes for sending the MCCH; or determining, by the UE according to the total quantity of subframes for sending the MCCH, a starting subframe for sending the MCCH, and the MBSFN subframe configuration, all subframes for sending the MCCH.

With reference to any one of the fourth to the ninth possible implementations of the second aspect, in a tenth possible implementation of the second aspect, the method further includes:

determining, by the base station, the starting subframe according to the MCCH subframe set configuration information, and using the starting subframe as a subframe of an MCCH change notification; or determining, by the base station according to the MCCH subframe set configuration information, all the subframes for sending the MCCH, and using any subframe in all the subframes for sending the MCCH as a subframe of an MCCH change notification.

With reference to any one of the first to the tenth possible implementations of the second aspect, in an eleventh possible implementation of the second aspect, the sending, by the base station, an MCCH message according to the MCCH sending time information by using the MCCH-RNTI includes:

sending, by the base station by using the MCCH-RNTI, a physical downlink control channel PDCCH or an enhanced physical downlink control channel EPDCCH in the subframe location corresponding to the time of sending the MCCH; and sending, by the base station, the MCCH message in a specified MCCH message resource location on the PDCCH or the EPDCCH.

With reference to any one of the second aspect or the first to the eleventh possible implementations of the second aspect, in a twelfth possible implementation of the second aspect, the configuration information of the multicast service includes a temporary multicast group identifier and a G-RNTI for scheduling the multicast service, and the sending, by the base station, the multicast service according to the configuration information of the multicast service includes:

sending, by the base station according to the G-RNTI for scheduling the multicast service, the multicast service corresponding to the temporary multicast group identifier.

With reference to the twelfth possible implementation of the second aspect, in a thirteenth possible implementation of the second aspect, the sending, by the base station according to the G-RNTI for scheduling the multicast service, the multicast service corresponding to the temporary multicast group identifier includes:

determining, by the base station, a frequency resource and a modulation scheme that are of the multicast service corresponding to the temporary multicast group identifier; and sending, by the base station, PDCCH scheduling information to UE according to the G-RNTI of the multicast service, where the PDCCH scheduling information carries the frequency resource and the modulation scheme, and sending the multicast service according to the frequency resource and the modulation scheme.

With reference to any one of the second aspect or the first to the eleventh possible implementations of the second aspect, in a fourteenth possible implementation of the second aspect, the configuration information of the multicast service includes a temporary multicast group identifier and scheduling information of the multicast service, and the scheduling information of the multicast service includes a frequency resource and a modulation scheme that are used to send the multicast service, and the sending, by the base station, the multicast service according to the configuration information of the multicast service includes:

sending, by the base station according to the frequency resource and the modulation scheme that are used for the multicast service, the multicast service corresponding to the temporary multicast group identifier.

With reference to any one of the second aspect or the first to the fourteenth possible implementations of the second aspect, in a fifteenth possible implementation of the second aspect, after the determining, by a base station, MCCH configuration information, the method further includes:

if the base station determines that the MCCH changes, sending, by the base station, a change notification of the MCCH; and resending, by the base station, the MCCH message according to the MCCH configuration information.

With reference to the fifteenth possible implementation of the second aspect, in a sixteenth possible implementation of the second aspect, the sending, by the base station, a change notification of the MCCH includes:

determining, by the base station, an MCCH modification period of the MCCH; and sending, by the base station, a change identifier on the PDCCH or the EPDCCH in the MCCH modification period according to the MCCH-RNTI, where the change identifier includes any one of the following change identifiers: a change identifier in a change identifier field of the PDCCH or the EPDCCH, an NDI, a process number, or a combination of an NDI and a process number, where the change identifier is different from a change identifier in a previous modification period, or the change identifier is a change identifier of a first preset value.

With reference to the fifteenth possible implementation of the second aspect, in a seventeenth possible implementation of the second aspect, the sending, by the base station, a change notification of the MCCH includes:

determining, by the base station, an MCCH modification period of the MCCH and an M-RNTI corresponding to the MCCH modification period; and sending, by the base station, a bit value in a change notification field corresponding to the MCCH, where the bit value is the same as a second preset value, and the change notification field corresponding to the MCCH is a change notification field included on a PDCCH corresponding to the M-RNTI in a non-MBSFN subframe.

With reference to any one of the fifteenth to the seventeenth possible implementations of the second aspect, in an eighteenth possible implementation of the second aspect, the resending, by the base station, the MCCH message according to the MCCH configuration information includes:

resending, by the base station according to the MCCH configuration information, the MCCH message in a current MCCH modification period in which it is determined that the MCCH changes; or resending, by the base station according to the MCCH configuration information, the MCCH message in a next MCCH modification period of a current MCCH modification period in which it is determined that the MCCH changes.

With reference to the sixteenth or the seventeenth possible implementation of the second aspect, in a nineteenth possible implementation of the second aspect, the determining, by the base station, an MCCH modification period of the MCCH includes:

if the MCCH sending period information includes only one MCCH modification period, determining, by the base station, the MCCH modification period as the MCCH modification period; or if the MCCH sending period information includes multiple MCCH modification periods and each MCCH modification period has a period selection parameter corresponding to the MCCH modification period, determining, by the base station, the MCCH modification period according to the MCCH period selection parameter and a multicast service that needs to be sent by the base station; or if the MCCH configuration information includes multiple MCCHs, each MCCH has multiple MCCH modification periods, and each MCCH has an MCCH selection parameter corresponding to the MCCH, determining, by the base station according to the MCCH selection parameter and a multicast service that needs to be sent by the base station, an MCCH that needs to be sent; and determining, by the base station, the MCCH modification period according to an MCCH period selection parameter and the multicast service that needs to be sent by the base station.

With reference to any one of the first to the nineteenth possible implementations of the second aspect, in a twentieth possible implementation of the second aspect, the MCCH configuration information includes at least one of pre-defined configuration information or configuration information that is sent by an MCE to the base station.

According to a third aspect, the present disclosure provides user equipment UE, including various modules configured to perform the steps of the method in the first aspect.

According to a fourth aspect, the present disclosure provides a base station, including various modules configured to perform the steps of the method in the second aspect.

According to a fifth aspect, user equipment UE is provided. A structure of the UE includes a receiver, a transmitter, and a processor. The processor is configured to support the UE in performing corresponding functions in the foregoing method. The transmitter is configured to support the UE in communicating with a mobile network server. The UE may further include a memory. The memory is configured to be coupled to the processor and stores a program instruction and data that are required by the UE. The UE may further include a communications interface configured to communicate, by the UE, with another device or a communications network.

According to a sixth aspect, a base station is provided. A structure of the base station includes a receiver, a transmitter, and a processor. The processor is configured to support the base station in performing corresponding functions in the foregoing method. The transmitter is configured to support the base station in communicating with a mobile network server. The base station may further include a memory. The memory is configured to be coupled to the processor and stores a program instruction and data that are required by the base station. The base station may further include a communications interface configured to communicate, by the base station, with another device or a communications network.

According to a seventh aspect, the present disclosure provides a computer storage medium, configured to store a computer software instruction used by the foregoing UE, and the computer software instruction includes a program designed to perform the foregoing aspect.

According to an eighth aspect, the present disclosure provides a computer storage medium, configured to store a computer software instruction used by the foregoing base station, and the computer software instruction includes a program designed to perform the foregoing aspect.

The following beneficial effects can be achieved by means of implementing the embodiments of the present disclosure:

In the embodiments of the present disclosure, the user equipment UE determines the MCCH configuration information, where the configuration information includes the MCCH-RNTI and the MCCH sending period information; the UE determines the MCCH sending time information according to the MCCH sending period information; the UE reads the MCCH message according to the MCCH sending time information by using the MCCH-RNTI, where the MCCH message includes the configuration information of the multicast service; and the UE reads the multicast service according to the configuration information of the multicast service. In the embodiments of the present disclosure, the UE identifies an MCCH in a subframe by using a configured MCCH-RNTI. Therefore, the MCCH can be transmitted in any subframe and identified by the UE, and is not restricted to being transmitted only in an MBSFN subframe, so that another non-MBSFN subframe can also be used to transmit the MCCH. Therefore, in the embodiments of the present disclosure, MCCHs may not be all transmitted in MBSFN subframes, so that some MBSFN subframes may not be used to transmit the MCCHs but are all used to transmit MBSFN service data related to the UE, so as to reduce waste of MBSFN subframe resources caused by the fact that the MBSFN subframes need to be used to transmit MCCH messages and the MBSFN subframe resources cannot be fully used by the MCCHs.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make a person skilled in the art understand the solutions in the present disclosure better, the following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The following separately gives detailed descriptions.

In the specification, claims, and accompanying drawings of the present disclosure, the terms "first", "second", "third", "fourth", and the like are intended to distinguish between different objects but do not indicate a particular order. In addition, the terms "including", "having", and any other variants thereof are intended to cover a non-exclusive inclusion. For example, a process, a method, a system, a product, or a device that includes a series of steps or modules is not limited to listed steps or modules, but optionally further includes an unlisted step or module, or optionally further includes another inherent step or unit of the process, the method, the product, or the device.

A mention of an "embodiment" in this specification means that a particular feature, structure, or characteristic described with reference to the embodiment may be included in at least one embodiment of the present disclosure. The term appearing at each place in this specification may not refer to a same embodiment or an independent or a candidate embodiment that is mutually exclusive with another embodiment. A person skilled in the art explicitly or implicitly understands that the embodiment described in this specification may be combined with another embodiment.

Figure 1:
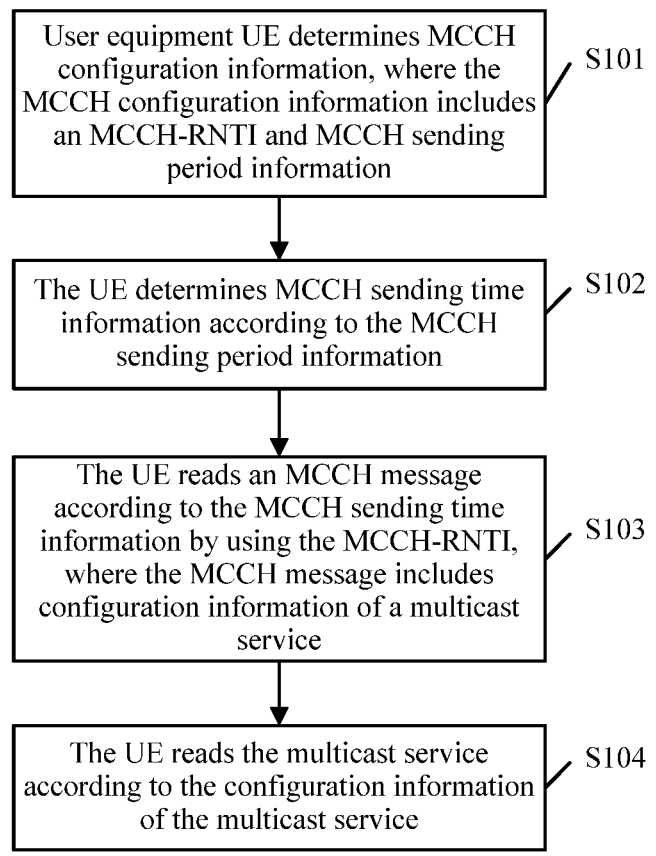
FIG. 1 is a flowchart of a multicast service reading method according to an embodiment of the present disclosure.

Referring to FIG. 1, FIG. 1 is a flowchart of a first embodiment of a multicast service reading method according to an embodiment of the present disclosure. As shown in FIG. 1, the multicast service reading method according to this embodiment of the present disclosure may include steps S101 to S104.

S101: User equipment UE determines MCCH configuration information, where the MCCH configuration information includes an MCCH-RNTI and MCCH sending period information.

In this embodiment of the present disclosure, the user equipment UE may include various types of UEs such as a mobile phone, a tablet computer, a personal digital assistant (PDA), a mobile Internet device (MID), and an intelligent wearable device (for example, a smartwatch or a smart band). This is not limited in this embodiment of the present disclosure.

In this embodiment of the present disclosure, the MCCH configuration information may be pre-defined configuration information (for example, MCCH configuration information agreed upon by the UE and a base station by using a protocol). Alternatively, the MCCH configuration information may be a system broadcast message that is sent by a base station and received by the UE, and the broadcast message carries the MCCH configuration information. Alternatively, a part of the MCCH configuration information may be pre-defined and the other part may be sent by a base station to the UE by using a system broadcast message (for example, the MCCH-RNTI and an MCCH sending period are sent by the base station to the UE by using the system broadcast message, and the other configuration information is pre-defined).

In this embodiment of the present disclosure, the MCCH-RNTI is used by the UE to perform PDCCH (physical downlink control channel) or EPDCCH (enhanced physical downlink control channel) detection. The MCCH configuration information includes at least one piece of MCCH configuration information. If the MCCH configuration information includes multiple pieces of MCCH configuration information, MCCH-RNTIs included in the multiple pieces of MCCH configuration information of MCCHs may be a same MCCH-RNTI, or MCCHs have different MCCH-RNTIs. The MCCH sending period information includes an MCCH modification period, an MCCH repetition period, and an offset parameter for sending an MCCH. One modification period or multiple modification periods may be configured for one MCCH. If multiple modification periods are configured for one MCCH, the MCCH sending period information further includes an MCCH period selection parameter corresponding to each MCCH modification period, so that the UE can select the MCCH modification period by using the MCCH period selection parameter. When the MCCH configuration information includes multiple pieces of MCCH configuration information, the MCCH configuration information further includes service type information corresponding to an MCCH. The service type information corresponding to the MCCH is used by the UE to choose to read an MCCH in multiple MCCHs according to the service type information.

In this embodiment of the present disclosure, the MCCH configuration information includes at least one piece of MCCH configuration information, and the UE may read one MCCH message or multiple MCCH messages. For example, the MCCH configuration information includes only one piece of MCCH configuration information, the UE reads the MCCH message according to the MCCH configuration information. For another example, the MCCH configuration information includes multiple pieces of MCCH configuration information, the UE may choose to read one MCCH in multiple MCCHs according to the service type information corresponding to the MCCH, or the UE may choose to read several MCCHs in multiple MCCHs according to the service type information corresponding to the MCCH. Similarly, the UE may read all MCCH messages included in the MCCH configuration information. A principle of reading one MCCH message by the UE is the same as a principle of reading multiple MCCHs. Therefore, in this embodiment of the present disclosure, detailed descriptions are provided by using an example in which the UE reads one MCCH message.

S102: The UE determines MCCH sending time information according to the MCCH sending period information.

In this embodiment of the present disclosure, a specific implementation of determining, by the UE, the MCCH sending time information according to the MCCH sending period information may be: determining, by the UE according to the MCCH repetition period and the offset parameter for sending the MCCH, a subframe location corresponding to a time of sending the MCCH, where the subframe location corresponding to the time of sending the MCCH is a subframe location for sending the MCCH.

In an embodiment of the present disclosure, if in each MCCH repetition period, there is only one subframe for sending the MCCH, a specific implementation of determining, by the UE according to the MCCH repetition period and the offset parameter for sending the MCCH, the subframe location corresponding to the time of sending the MCCH may be: determining, by the UE according to a system frame number, a subframe number, the MCCH repetition period, and the offset parameter for sending the MCCH, the subframe location corresponding to the time of sending the MCCH.

Specifically, the UE determines, according to a formula $\{[(SFN*10)+\text{subframe number}]\ \text{modulo}\ (R*10)=S\}$, the subframe location for sending the MCCH, where SFN is the system frame number, subframe number is the subframe number, R is the MCCH repetition period, and S is the offset parameter of the MCCH. The subframe for sending the MCCH is determined when the SFN and the subframe number satisfy the formula.

In another embodiment of the present disclosure, if in each MCCH repetition period, there are multiple candidate subframes for sending the MCCH, a specific implementation of determining, by the UE according to the MCCH repetition period and the offset parameter for sending the MCCH, a subframe location corresponding to the time of sending the MCCH may be: determining, by the UE according to a system frame number, the MCCH repetition period, and the offset parameter of the MCCH, a subframe location set corresponding to the time of sending the MCCH.

Specifically, the UE determines, according to a formula $\{(SFNs\ \text{module}\ (R)=S\}$, the subframe location for sending the MCCH, where SFNs is any system frame number, R is the MCCH repetition period, and S is the offset parameter of the MCCH. A frame for sending the MCCH is determined when the SFN satisfies the formula. A subframe included in the frame is determined as the subframe location set corresponding to the time of sending the MCCH.

S103: The UE reads an MCCH message according to the MCCH sending time information by using the MCCH-RNTI, where the MCCH message includes configuration information of a multicast service.

In this embodiment of the present disclosure, a specific implementation of reading, by the UE, the MCCH message according to the MCCH sending time information by using the MCCH-RNTI is: reading, by the UE by using the MCCH-RNTI, a physical downlink control channel PDCCH or an enhanced physical downlink control channel EPDCCH in the subframe location corresponding to the time of sending the MCCH; and reading, by the UE, the MCCH message in a specified MCCH message resource location on the PDCCH or the EPDCCH.

S104: The UE reads the multicast service according to the configuration information of the multicast service.

In an embodiment of the present disclosure, if the configuration information of the multicast service includes a temporary multicast group identifier and a G-RNTI for scheduling the multicast service, a specific implementation of reading, by the UE, the multicast service according to the configuration information of the multicast service is: reading, by the UE according to the G-RNTI for scheduling the multicast service, the multicast service corresponding to the temporary multicast group identifier.

Specifically, a specific implementation of reading, by the UE according to the G-RNTI for scheduling the multicast service, the multicast service corresponding to the temporary multicast group identifier is: reading, by the UE, PDCCH scheduling information according to the G-RNTI of the multicast service; and determining, by the UE according to the PDCCH scheduling information, a frequency resource and a modulation scheme that are corresponding to the multicast service corresponding to the temporary multicast group identifier, and reading the multicast service according to the frequency resource and the modulation scheme.

Optionally, if the configuration information of the multicast service includes a temporary multicast group identifier, a G-RNTI for scheduling the multicast service, and a transmission mode of the multicast service, a specific implementation of reading, by the UE, the multicast service according to the configuration information of the multicast service is: reading, by the UE according to the G-RNTI for scheduling the multicast service and the transmission mode of the multicast service, the multicast service corresponding to the temporary multicast group identifier.

Specifically, a specific implementation of reading, by the UE according to the G-RNTI for scheduling the multicast service, the multicast service corresponding to the temporary multicast group identifier is: reading, by the UE, PDCCH scheduling information according to the G-RNTI of the multicast service; and determining, by the UE according to the PDCCH scheduling information, a frequency resource and a modulation scheme that are corresponding to the multicast service corresponding to the temporary multicast group identifier, and reading the multicast service according to the frequency resource, the modulation scheme, and the transmission mode of the multicast service.

In another embodiment of the present disclosure, the configuration information of the multicast service includes a temporary multicast group identifier and scheduling information of the multicast service, and a specific implementation of reading, by the UE, the multicast service according to the configuration information of the multicast service is: reading, by the UE according to the scheduling information of the multicast service, the multicast service corresponding to the temporary multicast group identifier.

Specifically, a specific implementation of reading, by the UE according to the scheduling information of the multicast service, the multicast service corresponding to the temporary multicast group identifier is: determining, by the UE according to the scheduling information of the multicast service, a frequency resource, a time resource, a modulation scheme, a coding scheme, and the like that are corresponding to the multicast service, and further reading the multicast service.

Optionally, the configuration information of the multicast service includes a temporary multicast group identifier, scheduling information of the multicast service, and a transmission mode of the multicast service, and a specific implementation of reading, by the UE, the multicast service according to the configuration information of the multicast service is: reading, by the UE according to the scheduling information of the multicast service and the transmission mode of the multicast service, the multicast service corresponding to the temporary multicast group identifier.

Specifically, a specific implementation of reading, by the UE according to the scheduling information of the multicast service and the transmission mode of the multicast service, the multicast service corresponding to the temporary multicast group identifier is: determining, by the UE according to the scheduling information of the multicast service, a frequency resource, a time resource, a modulation scheme, a coding scheme, and the like that are corresponding to the multicast service, and further reading the multicast service.

It can be learned that, in this embodiment of the present disclosure, the user equipment UE determines the MCCH configuration information, where the configuration information includes the MCCH-RNTI and the MCCH sending period information; the UE determines the MCCH sending time information according to the MCCH sending period information; the UE reads the MCCH message according to the MCCH sending time information by using the MCCH-RNTI, where the MCCH message includes the configuration information of the multicast service; and the UE reads the multicast service according to the configuration information of the multicast service. In this embodiment of the present disclosure, the UE identifies an MCCH in a subframe by configuring an MCCH-RNTI. Therefore, the MCCH can be transmitted in any subframe and is not restricted to being transmitted only in an MBSFN subframe, so that another non-MBSFN subframe can also be used to transmit the MCCH. Therefore, MCCHs may not be all transmitted in MBSFN subframes, so that some MBSFN subframes may not be used to transmit the MCCHs but are all used to transmit MBSFN service data related to the UE, so as to reduce waste of the MBSFN subframes.

Optionally, after the determining, by UE, MCCH configuration information, the multicast service reading method shown in FIG. 1 further includes:

if the UE determines that the MCCH changes, re-reading, by the UE, the MCCH message according to the MCCH configuration information.

A specific implementation of re-reading, by the UE, the MCCH message according to the MCCH configuration information is: re-reading, by the UE according to the MCCH configuration information, the MCCH message in a current MCCH modification period in which it is determined that the MCCH changes; or re-reading, by the UE according to the MCCH configuration information, the MCCH message in a next MCCH modification period of a current MCCH modification period in which it is determined that the MCCH changes.

Optionally, before the re-reading, by the UE, the MCCH message according to the MCCH configuration information, the multicast service reading method shown in FIG. 1 further includes:

determining, by the UE, an MCCH modification period of the MCCH; reading, by the UE, the PDCCH or the EPDCCH in the MCCH modification period according to the MCCH-RNTI, to obtain an MCCH change identifier on the PDCCH or the EPDCCH, where the change identifier includes any one of the following change identifiers: a change identifier in a change identifier field of the PDCCH or the EPDCCH, an NDI, a process number, or a combination of an NDI and a process number; determining, by the UE according to the MCCH change identifier, whether the MCCH changes; and if the MCCH change identifier is different from a change identifier in a previous modification period, determining, by the UE, that the MCCH changes; or if the MCCH change identifier is the same as a first preset value, determining, by the UE, that the MCCH changes.

Optionally, before the re-reading, by the UE, the MCCH message according to the MCCH configuration information, the multicast service reading method shown in FIG. 1 further includes:

determining, by the UE, an MCCH modification period of the MCCH and an M-RNTI corresponding to the MCCH modification period; reading, by the UE in a non-MBSFN subframe, a change notification field included on a PDCCH corresponding to the M-RNTI; and if a bit value corresponding to the MCCH in the change notification field is the same as a second preset value, determining, by the UE, that the MCCH changes.

A specific implementation of determining, by the UE, the MCCH modification period of the MCCH may be: if the MCCH sending period information includes only one MCCH modification period, determining, by the UE, the MCCH modification period as the MCCH modification period; or if the MCCH sending period information includes multiple MCCH modification periods and each MCCH modification period has a period selection parameter corresponding to the MCCH modification period, determining, by the UE, the MCCH modification period according to the MCCH period selection parameter and a multicast service that needs to be read by the UE; or if the MCCH configuration information includes multiple MCCHs, each MCCH has multiple MCCH modification periods, and each MCCH has an MCCH selection parameter corresponding to the MCCH, determining, by the UE according to the MCCH selection parameter and a multicast service that needs to be read by the UE, an MCCH that needs to be read, and determining, by the UE, the MCCH modification period according to an MCCH period selection parameter and the multicast service that needs to be read by the UE.

Figure 2:
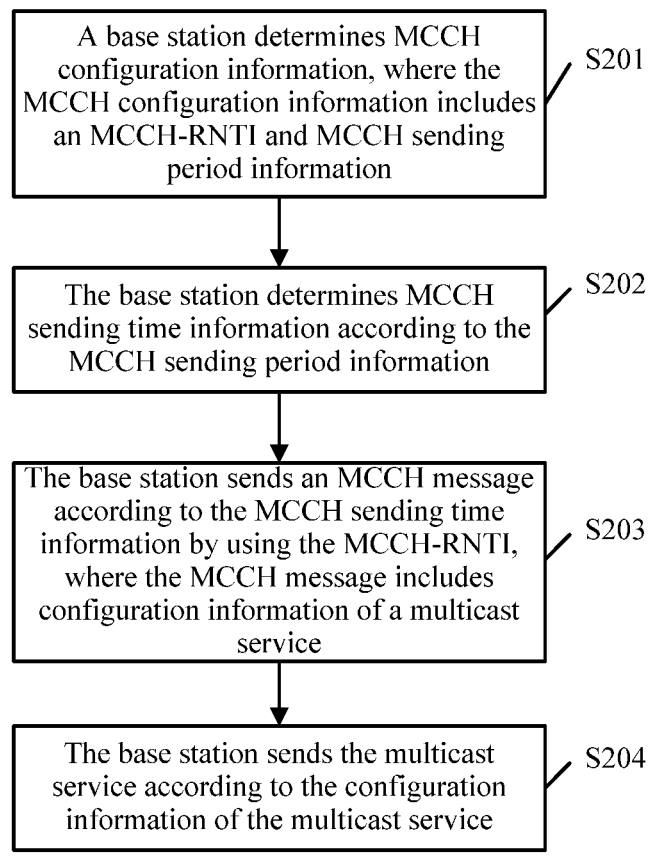
FIG. 2 is a flowchart of a multicast service sending method according to an embodiment of the present disclosure.

Referring to FIG. 2, FIG. 2 is a flowchart of a multicast service receiving and sending method according to an embodiment of the present disclosure. As shown in FIG. 2, the flowchart of the multicast service receiving and sending method according to this embodiment of the present disclosure may include steps S201 to S204.

S201: A base station determines MCCH configuration information, where the MCCH configuration information includes an MCCH-RNTI and MCCH sending period information.

S202: The base station determines MCCH sending time information according to the MCCH sending period information.

In this embodiment of the present disclosure, a specific implementation of determining, by the base station, the MCCH sending time information according to the MCCH sending period information is: determining, by the base station according to an MCCH repetition period and an offset parameter for sending an MCCH, a subframe location corresponding to a time of sending the MCCH.

In an embodiment of the present disclosure, if in each MCCH repetition period, there is only one subframe for sending the MCCH, a specific implementation of determining, by the base station according to the MCCH repetition period and the offset parameter for sending the MCCH, the subframe location corresponding to the time of sending the MCCH is: determining, by the base station according to a system frame number, a subframe number, the MCCH repetition period, and the offset parameter for sending the MCCH, the subframe location corresponding to the time of sending the MCCH.

In another embodiment of the present disclosure, if in each MCCH repetition period, there are multiple candidate subframes for sending the MCCH, a specific implementation of determining, by the base station according to the MCCH repetition period and the offset parameter for sending the MCCH, the subframe location corresponding to the MCCH sending time information is: determining, by the base station according to a system frame number, the MCCH repetition period, and the offset parameter of the MCCH, a subframe location set corresponding to the time of sending the MCCH.

S203: The base station sends an MCCH message according to the MCCH sending time information by using the MCCH-RNTI, where the MCCH message includes configuration information of a multicast service.

In this embodiment of the present disclosure, a specific implementation of sending, by the base station, the MCCH message according to the MCCH sending time information by using the MCCH-RNTI is: sending, by the base station by using the MCCH-RNTI, a physical downlink control channel PDCCH or an enhanced physical downlink control channel EPDCCH in the subframe location corresponding to the time of sending the MCCH; and sending, by the base station, the MCCH message in a specified MCCH message resource location on the PDCCH or the EPDCCH.

S204: The base station sends the multicast service according to the configuration information of the multicast service.

In this embodiment of the present disclosure, the configuration information of the multicast service includes at least one of the following information: a temporary multicast group identifier (for example, a TMGI), a G-RNTI for scheduling the multicast service, scheduling information of the multicast service, or a transmission mode TM (for example, TM1: a single-antenna mode, TM2: a transmit diversity mode, or TM3: an open-loop multiple-input multiple-output mode) of the multicast service.

In an embodiment of the present disclosure, a specific implementation of sending, by the base station, the multicast service according to the configuration information of the multicast service is: sending, by the base station according to the G-RNTI for scheduling the multicast service, the multicast service corresponding to the temporary multicast group identifier.

A specific implementation of sending, by the base station according to the G-RNTI for scheduling the multicast service, the multicast service corresponding to the temporary multicast group identifier is: sending, by the base station, PDCCH scheduling information or E-PDCCH scheduling information to UE according to the G-RNTI of the multicast service, where the PDCCH scheduling information or the E-PDCCH scheduling information carries the frequency resource and the modulation scheme; and sending the multicast service according to the frequency resource and the modulation scheme.

Optionally, the G-RNTI for scheduling the multicast service and the temporary multicast group identifier are sent by an MCE to the base station. A specific implementation is: receiving, by the base station, identifier configuration information sent by the MCE to the base station, where the identifier configuration information is a multicast service enabling notification, and the multicast service enabling notification carries the temporary multicast group identifier of a service of multicast transmission and the G-RNTI for scheduling the multicast service; and determining, by the base station according to the multicast service enabling notification, the G-RNTI for scheduling the multicast service and the temporary multicast group identifier that are used to read the multicast service. The MCE sends the G-RNTI for scheduling the multicast service and the temporary multicast group identifier to base stations, so as to ensure that the UE reads the same G-RNTI for scheduling the multicast service and the same temporary multicast group identifier.

In another embodiment of the present disclosure, a specific implementation of sending, by the base station, the multicast service according to the configuration information of the multicast service is: sending, by the base station, PDCCH scheduling information or E-PDCCH scheduling information to UE according to the G-RNTI of the multicast service, where the PDCCH scheduling information or the E-PDCCH scheduling information carries the frequency resource and the modulation scheme; and sending the multicast service according to the frequency resource, the modulation scheme, and the transmission mode of the multicast service.

In another embodiment of the present disclosure, a specific implementation of sending, by the base station, the multicast service according to the configuration information of the multicast service is: sending, by the base station according to the scheduling information of the multicast service, the multicast service corresponding to the temporary multicast group identifier.

Specifically, the base station determines, according to the scheduling information of the multicast service, a frequency resource, a time resource, a modulation scheme, a coding scheme, and the like that are corresponding to the multicast service, and then sends the multicast service according to the frequency resource, the time resource, the modulation scheme, the coding scheme, and the like that are corresponding to the multicast service.

In another embodiment of the present disclosure, a specific implementation of sending, by the base station, the multicast service according to the configuration information of the multicast service is: sending, by the base station according to the scheduling information of the multicast service and the transmission mode of the multicast service, the multicast service corresponding to the temporary multicast group identifier.

It can be learned that, in this embodiment of the present disclosure, the base station determines the MCCH configuration information, where the MCCH configuration information includes the MCCH-RNTI and the MCCH sending period information; the base station determines the MCCH sending time information according to the MCCH sending period information; the base station sends the MCCH message according to the MCCH sending time information by using the MCCH-RNTI, where the MCCH message includes the configuration information of the multicast service; and the base station sends the multicast service according to the configuration information of the multicast service. In this embodiment of the present disclosure, the UE identifies an MCCH in a subframe by configuring an MCCH-RNTI. Therefore, the MCCH can be transmitted in any subframe and is not restricted to being transmitted only in an MBSFN subframe, so that another non-MBSFN subframe can also be used to transmit the MCCH. Therefore, MCCHs may not be all transmitted in MBSFN subframes, so that some MBSFN subframes may not be used to transmit the MCCHs but are all used to transmit MBSFN service data related to the UE, so as to reduce waste of the MBSFN subframes.

Optionally, after the determining, by a base station, MCCH configuration information, the multicast service sending method shown in FIG. 2 further includes:

if the base station determines that the MCCH changes, sending, by the base station, a change notification of the MCCH; and resending, by the base station, the MCCH message according to the MCCH configuration information.

Optionally, a specific implementation of sending, by the base station, the change notification of the MCCH is: determining, by the base station, an MCCH modification period of the MCCH; and sending, by the base station, a change identifier on the PDCCH or the EPDCCH in the MCCH modification period according to the MCCH-RNTI, where the change identifier includes an NDI and/or a process number. The change identifier is different from a change identifier in a previous modification period or the change identifier is a change identifier of a first preset value.

Optionally, a specific implementation of sending, by the base station, the change notification of the MCCH is: determining, by the base station, an MCCH modification period of the MCCH and an M-RNTI corresponding to the MCCH modification period; and sending, by the base station, a bit value in a change notification field corresponding to the MCCH, where the bit value is the same as a second preset value, and the change notification field corresponding to the MCCH is a change notification field included on a PDCCH corresponding to the M-RNTI in a non-MBSFN subframe.

Optionally, the resending, by the base station, the MCCH message according to the MCCH configuration information includes:

resending, by the base station according to the MCCH configuration information, the MCCH message in a current MCCH modification period in which it is determined that the MCCH changes; or resending, by the base station according to the MCCH configuration information, the MCCH message in a next MCCH modification period of a current MCCH modification period in which it is determined that the MCCH changes.

Optionally, the determining, by the base station, an MCCH modification period of the MCCH includes:

if the MCCH sending period information includes only one MCCH modification period, determining, by the base station, the MCCH modification period as the MCCH modification period; or if the MCCH sending period information includes multiple MCCH modification periods and each MCCH modification period has a period selection parameter corresponding to the MCCH modification period, determining, by the base station, the MCCH modification period according to the MCCH period selection parameter and a multicast service that needs to be sent by the base station; or if the MCCH configuration information includes multiple MCCHs, each MCCH has multiple MCCH modification periods, and each MCCH has an MCCH selection parameter corresponding to the MCCH, determining, by the base station according to the MCCH selection parameter and a multicast service that needs to be sent by the base station, an MCCH that needs to be sent, and determining, by the base station, the MCCH modification period according to an MCCH period selection parameter and the multicast service that needs to be sent by the base station.

Optionally, after the determining, by a base station, MCCH configuration information, the multicast service sending method shown in FIG. 2 further includes: sending, by the base station, a system broadcast message to the UE, where the message carries the MCCH configuration information, so that the UE reads the MCCH message according to the MCCH configuration information.

Figure 3:
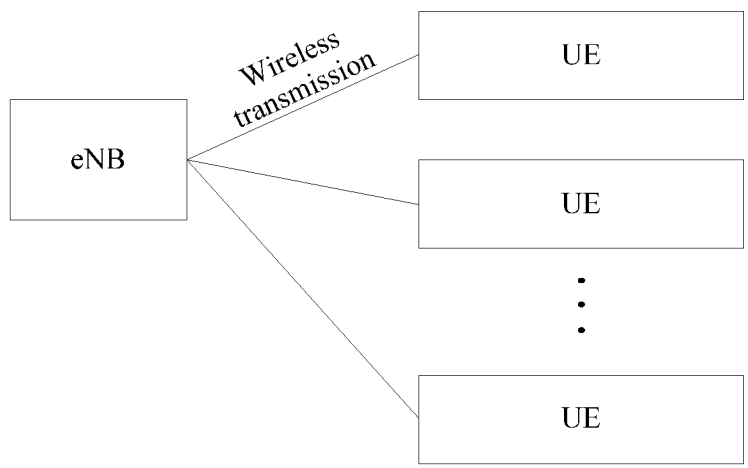
FIG. 3 is a schematic diagram of a network architecture according to an embodiment of the present disclosure.

For ease of understanding of the embodiments of the present disclosure, a network architecture in the embodiments of the present disclosure is first described below. Referring to FIG. 3, FIG. 3 is a schematic diagram of a network architecture according to an embodiment of the present disclosure. As shown in FIG. 3, the network architecture in this embodiment of the present disclosure may include UE and a base station. The base station determines MCCH sending time information according to MCCH configuration information, and sends an MCCH message according to the MCCH sending time information by using an MCCH-RNTI, where the MCCH message includes configuration information of a multicast service. Then, the base station sends the multicast service according to the configuration information of the multicast service. The UE determines the MCCH sending time information according to the MCCH configuration information, and reads the MCCH message according to the MCCH sending time information by using the MCCH-RNTI, where the MCCH message includes the configuration information of the multicast service. Then, the UE reads the multicast service according to the configuration information of the multicast service.

In the network architecture shown in FIG. 3, the UE identifies an MCCH in a subframe by configuring an MCCH-RNTI. Therefore, the MCCH can be transmitted in any subframe and is not restricted to being transmitted only in an MBSFN subframe, so that another non-MBSFN subframe can also be used to transmit the MCCH. Therefore, MCCHs may not be all transmitted in MBSFN subframes, so that some MBSFN subframes may not be used to transmit the MCCHs but are all used to transmit MBSFN service data related to the UE, so as to reduce waste of the MBSFN subframes.

Figure 4:
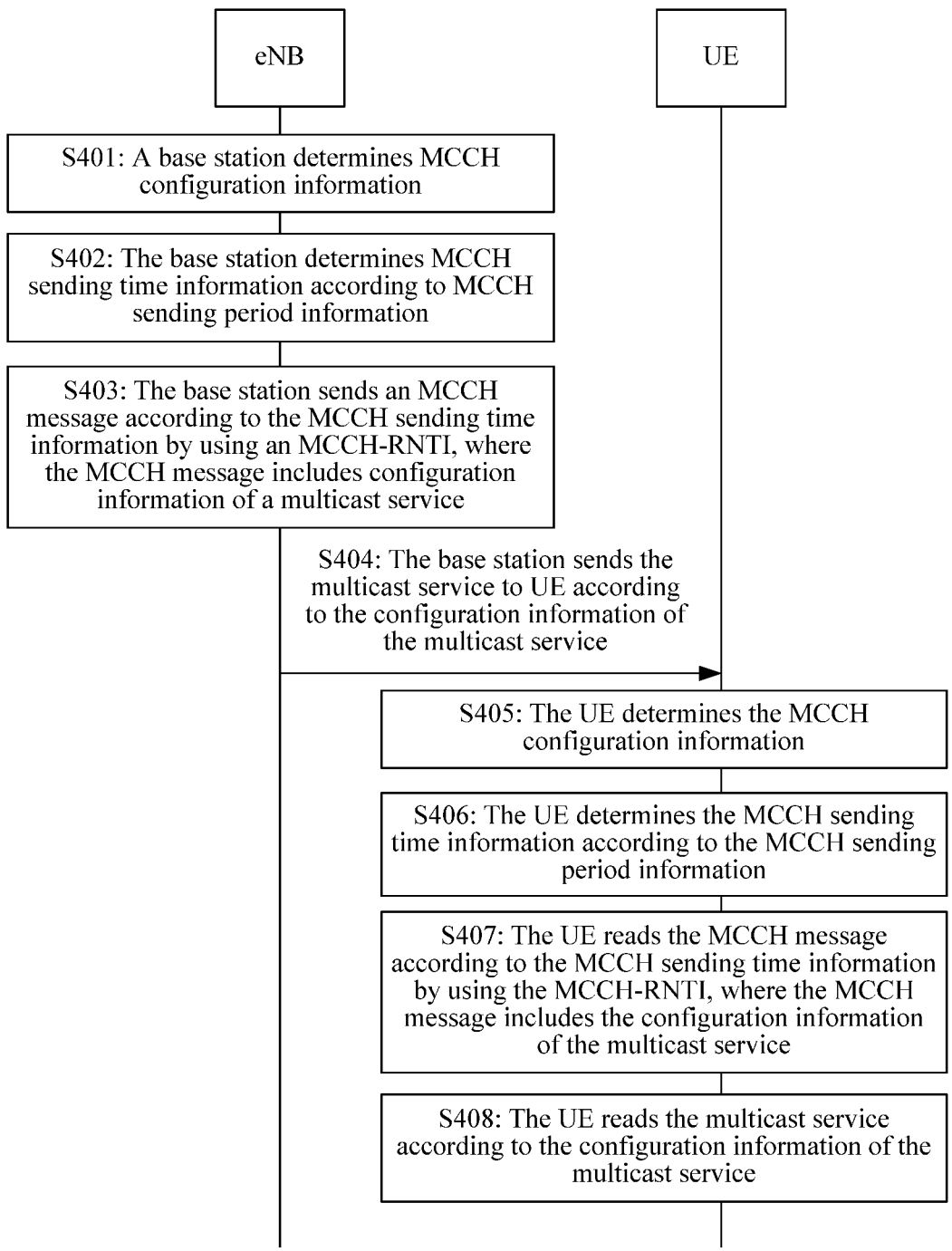
FIG. 4 is a flowchart of a multicast service receiving and sending method according to an embodiment of the present disclosure.

Based on the network architecture shown in FIG. 3, an embodiment of the present disclosure discloses a multicast service receiving and sending method. Referring to FIG. 4, FIG. 4 is a flowchart of the multicast service receiving and sending method according to this embodiment of the present disclosure. As shown in FIG. 4, the multicast service receiving and sending method according to this embodiment of the present disclosure may include steps S401 to S408.

S401: A base station determines MCCH configuration information, where the MCCH configuration information includes an MCCH-RNTI and MCCH sending period information.

S402: The base station determines MCCH sending time information according to the MCCH sending period information.

S403: The base station sends an MCCH message according to the MCCH sending time information by using the MCCH-RNTI, where the MCCH message includes configuration information of a multicast service.

S404: The base station sends the multicast service to UE according to the configuration information of the multicast service.

S405: The UE determines the MCCH configuration information, where the MCCH configuration information includes the MCCH-RNTI and the MCCH sending period information.

S406: The UE determines the MCCH sending time information according to the MCCH sending period information.

S407: The UE reads the MCCH message according to the MCCH sending time information by using the MCCH-RNTI, where the MCCH message includes the configuration information of the multicast service.

S408: The UE reads, according to the configuration information of the multicast service, the multicast service that is sent by the base station to the UE.

In this embodiment of the present disclosure, the configuration information in step S404 may be sent by the base station to the UE after step S401, or may be pre-defined by the UE and the base station (for example, MCCH configuration information that is agreed upon by the UE and the base station by using a protocol). Alternatively, a part of the configuration information in step S404 is sent by the base station to the UE after step S401, and a part of the configuration information is pre-defined by the UE and the base station.

In this embodiment of the present disclosure, a specific implementation of determining the MCCH sending time information in step S402 and step S406 is:

If in each MCCH repetition period, there is only one subframe for sending an MCCH, a specific implementation of determining, by the UE/base station according to an MCCH repetition period and an offset parameter for sending the MCCH, a subframe location corresponding to a time of sending the MCCH may be: determining, by the UE/base station according to a system frame number, a subframe number, the MCCH repetition period, and the offset parameter for sending the MCCH, the subframe location corresponding to the MCCH sending time information.

Specifically, the UE/base station determines, according to a formula $\{[(SFN*10)+\text{subframe number}] \text{ modulo } (R*10)=S\}$, a subframe location for sending the MCCH, where SFN is the system frame number, subframe number is the subframe number, R is the MCCH repetition period, and S is the offset parameter of the MCCH.

Figure 5:
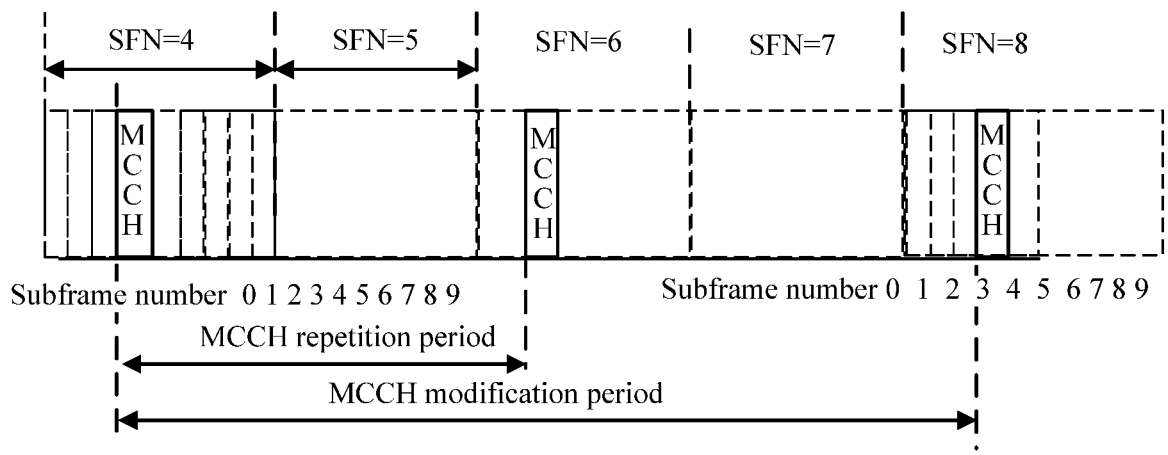
FIG. 5 to FIG. 8 are schematic diagrams of an MCCH transmission mechanism according to an embodiment of the present disclosure.

For example, as shown in FIG. 5, the MCCH repetition period R is equal to 2, and the offset parameter S of the MCCH is equal to 3. According to the formula $\{[(SFN*10)+\text{subframe number}] \text{ modulo } (R*10)=S\}$, if SFN=2, 2*10+mod 20=3, and the formula is satisfied; if SFN=4, 4*10+mod 20=3, and the formula is satisfied; if SFN=5, 5*10+mod 20=13, and the formula is not satisfied; if SFN=6, 6*10+mod 20=3, and the formula is satisfied; and the like. Therefore, it can be obtained that third subframes of frames whose SFNs are 2, 4, 6, and the like satisfy a condition of sending the MCCH. Therefore, the third subframes of the frames whose SFNs are 2, 4, 6, and the like are the subframe location corresponding to the time of sending the MCCH.

If in each MCCH repetition period, there are multiple candidate subframes for sending an MCCH, a specific implementation of determining, by the UE/base station according to an MCCH repetition period and an offset parameter for sending the MCCH, a subframe location corresponding to a time of sending the MCCH may be: determining, by the UE/base station according to a system frame number, the MCCH repetition period, and the offset parameter of the MCCH, a subframe location set corresponding to the time of sending the MCCH.

Specifically, the UE/base station determines, according to a formula $\{(SFNs \text{ module } (R)=S\}$, a subframe location for sending the MCCH, where SFNs is any system frame number, R is the MCCH repetition period, and S is the offset parameter of the MCCH.

Figure 6:
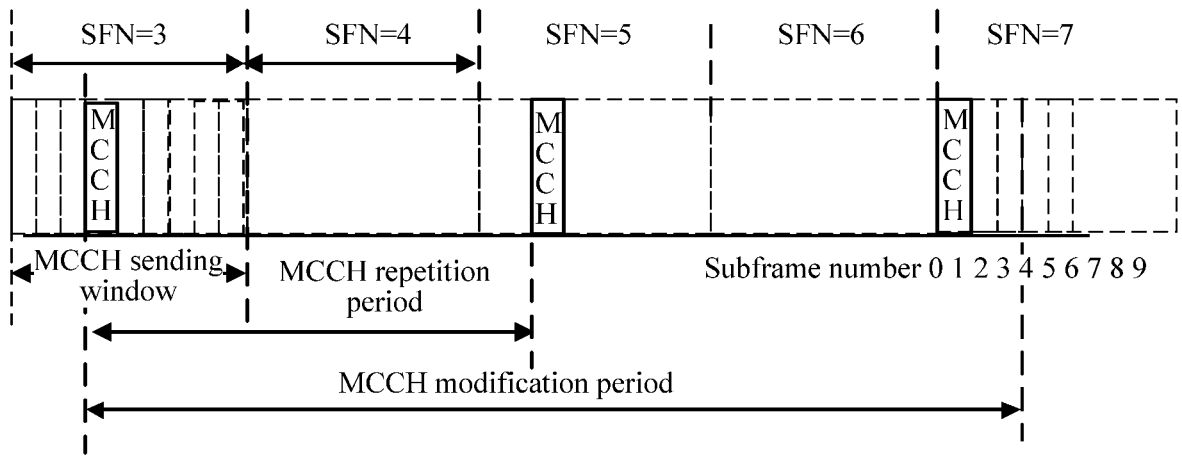

For example, as shown in FIG. 6, the MCCH repetition period R is equal to 2, and the offset parameter S of the MCCH is equal to 1. According to the formula $\{(SFNs \text{ module } (R)=S\}$, if SFNs=3, 3mod2=1, and the formula is satisfied; if SFNs=4, 4mod2=0, and the formula is not satisfied; if SFNs=7, 7mod2=1, and the formula is satisfied; if SFNs=9, 9mod2=1, and the formula is satisfied; and the like. Therefore, it can be obtained that frames whose SFNs are 3, 7, 9, and the like satisfy a condition of sending the MCCH. That is, subframes included in the frames whose SFNs are 3, 7, 9, and the like may all be used to send the MCCH. In this case, the UE needs to detect all the subframes of the frames by using the MCCH-RNTI, so as to help to determine a subframe for sending the MCCH message. The frames satisfying the formula $\{(SFNs \text{ module } (R)=S\}$ are the subframe location set corresponding to the time of sending the MCCH.

If in each MCCH repetition period, there is one or more subframes for sending an MCCH, a specific implementation of determining, by the UE/base station according to an MCCH repetition period and an offset parameter for sending the MCCH, a subframe location corresponding to a time of sending the MCCH may be: determining, by the UE/base station, a frame of sending the MCCH according to a system frame number, the MCCH repetition period, and the offset parameter of the MCCH; and determining, by the UE/base station according to MCCH subframe set configuration information and the frame of the MCCH, a subframe location set corresponding to the MCCH sending time information.

Optionally, the MCCH subframe set configuration information includes an MCCH subframe sequence. Alternatively, the MCCH subframe set configuration information includes an MCCH subframe starting location. Alternatively, the MCCH subframe set configuration information includes an MCCH subframe starting location and sending duration information.

Optionally, for the UE, the MCCH subframe set configuration information may be sent by the base station to the UE by using MCCH configuration signaling, or may be predefined. This is not limited in the present disclosure. The MCCH configuration signaling may be a system broadcast message or dedicated signaling of the UE.

Optionally, for the base station, the MCCH subframe set configuration information is determined by the base station according to subframe information of a to-be-sent MCCH.

The subframe information of the to-be-sent MCCH includes a subframe location of the to-be-sent MCCH, the MCCH subframe set configuration information includes an MCCH subframe sequence, and the MCCH subframe sequence is determined by the base station according to the subframe location of the to-be-sent MCCH. Alternatively, the subframe information of the to-be-sent MCCH includes a quantity of subframes of the to-be-sent MCCH, and if there is one subframe of the to-be-sent MCCH, the MCCH subframe set configuration information includes an MCCH subframe starting location, or if there are multiple subframes of the to-be-sent MCCH, the MCCH subframe set configuration information includes an MCCH subframe starting location and sending duration information.

Optionally, a specific implementation of determining, by the UE/base station, the frame of the MCCH according to the system frame number, the MCCH repetition period, and the offset parameter of the MCCH is: determining, by the UE/base station according to a formula {(SFNs module (R)=S}, the frame for sending the MCCH, where SFNs is the system frame number, R is the MCCH repetition period, and S is the offset parameter of the MCCH. A system frame corresponding to SFN satisfying the formula is a system frame for sending the MCCH.

Optionally, the MCCH subframe sequence is a bitmap sequence or a subframe set sequence. A specific implementation of determining, by the UE according to the frame for sending the MCCH, a value of each bit in the bitmap sequence, and a subframe number corresponding to each bit in the bitmap sequence, the subframe location set corresponding to the MCCH sending time information is that each bit in the bitmap sequence is corresponding to one subframe, and the value of each bit in the bitmap sequence identifies whether the corresponding subframe is used to send the MCCH. For example, the bitmap sequence includes 10 bits, and the first to the tenth bits are respectively corresponding to subframes 0 to 9. Specifically, for example, the bitmap sequence is 001100000, indicating that a subframe 2 and a subframe 3 are used to send the MCCH and the remaining subframes are not used to send the MCCH. The subframe set sequence is a set formed by subframes. For example, if the subframe set sequence includes subframes 2, 3, and 4, it indicates that the subframes 2, 3, and 4 are used to send the MCCH and the remaining subframes are not used to send the MCCH.

The MCCH subframe starting location is used to indicate a starting subframe for sending the MCCH, and the sending duration information is used to indicate a total quantity of subframes required for sending the MCCH or a total quantity of other subframes required for sending the MCCH than the starting subframe.

A specific implementation of determining, by the UE/base station according to the MCCH subframe starting location, the starting subframe for sending the MCCH, and determining, according to the starting subframe of sending the MCCH and the sending duration information, all subframes for sending the MCCH is:

for the base station, if the MCCH can be completely sent in one subframe, configuring, by the base station in the MCCH subframe set configuration information, the starting subframe for sending the MCCH, not configuring the sending duration information, and sending the MCCH in the starting subframe for sending the MCCH; or if the MCCH cannot be completely sent in one subframe, configuring, by the base station in the MCCH subframe set configuration information, the starting subframe for sending the MCCH, configuring the sending duration information, and determining, by the base station according to the starting subframe and sending duration, the subframes for sending the MCCH, where a specific determining method is the same as a determining method performed by the UE; and for the UE, if the MCCH subframe set configuration information includes the sending duration information, determining, by the UE according to the sending duration information, a total quantity of subframes for sending the MCCH; and determining, by the UE according to the total quantity of subframes for sending the MCCH and the starting subframe for sending the MCCH, all the subframes for sending the MCCH, or determining, by the UE according to the total quantity of subframes for sending the MCCH, the starting subframe for sending the MCCH, and an MBSFN subframe configuration, all the subframes for sending the MCCH; or if the MCCH subframe set configuration information does not include the sending duration information, determining, by the UE/base station, that there is one subframe for sending the MCCH, where the subframe is the starting subframe for sending the MCCH.

For example, if the MCCH subframe set configuration information includes that the MCCH subframe starting location is a subframe 3 and duration is three subframes, the UE/base station determines that the subframes for sending the MCCH are subframes 3, 4, and 5 or subframes 3, 4, 5, and 6. For another example, if the MCCH subframe set configuration information includes that the MCCH subframe starting location is a subframe 3 and duration is three subframes, and the MBSFN subframe configuration indicates that subframes 4 and 5 are MBSFN subframes, the UE/base station determines that the subframes for sending the MCCH are three consecutive non-MBSFN subframes 3, 6, and 7 starting from the subframe 3. For another example, if the MCCH subframe set configuration information includes that the MCCH subframe starting location is a subframe 3 and there is no duration information, the UE/base station determines that the subframe for sending the MCCH is the subframe 3.

Optionally, the UE/base station may further determine the starting subframe according to the MCCH subframe set configuration information, and use the starting subframe as a subframe of an MCCH change notification. Alternatively, the UE/base station may further determine, according to the MCCH subframe set configuration information, all the subframes for sending the MCCH, and use any subframe in all the subframes for sending the MCCH as a subframe of an MCCH change notification.

Specifically, the MCCH subframe set configuration information includes the starting subframe location, and the UE/base station may determine the starting subframe according to the starting subframe location, and use the starting subframe as the subframe of the MCCH change notification. Alternatively, the UE/base station may determine the MCCH subframe location set according to the MCCH subframe set configuration information, and the UE/base station may determine, according to the MCCH subframe location set, all the subframes for sending the MCCH, and use any subframe in all the subframes for sending the MCCH as the subframe of the MCCH change notification.

It can be learned that, in this embodiment of the present disclosure, the user equipment UE determines the MCCH configuration information, where the configuration information includes the MCCH-RNTI and the MCCH sending period information; the UE determines the MCCH sending time information according to the MCCH sending period information; the UE reads the MCCH message according to the MCCH sending time information by using the MCCH-RNTI, where the MCCH message includes the configuration information of the multicast service; and the UE reads the multicast service according to the configuration information of the multicast service. In this embodiment of the present disclosure, the UE identifies an MCCH in a subframe by configuring an MCCH-RNTI. Therefore, the MCCH can be transmitted in any subframe and is not restricted to being transmitted only in an MBSFN subframe, so that another non-MBSFN subframe can also be used to transmit the MCCH. Therefore, MCCHs may not be all transmitted in MBSFN subframes, so that some MBSFN subframes may not be used to transmit the MCCHs but are all used to transmit MBSFN service data related to the UE, so as to reduce waste of the MBSFN subframes.

Optionally, if the base station detects that the MCCH changes, the base station sends a change notification of the MCCH, and resends the MCCH message according to the MCCH configuration information. When determining that the MCCH changes, the UE re-reads the MCCH message according to the MCCH configuration information.

In this embodiment of the present disclosure, a specific implementation of determining, by the UE, that the MCCH changes is as follows:

The UE determines an MCCH modification period of the MCCH; the UE reads a PDCCH or an EPDCCH in the MCCH modification period according to the MCCH-RNTI, to obtain an MCCH change identifier on the PDCCH or the EPDCCH, where the change identifier includes any one of the following change identifiers: a change identifier in a change identifier field of the PDCCH or the EPDCCH, an NDI, a process number, or a combination of an NDI and a process number; the UE determines, according to the MCCH change identifier, whether the MCCH changes; and if the MCCH change identifier is different from a change identifier in a previous modification period, the UE determines that the MCCH changes; or if the MCCH change identifier is the same as a first preset value, the UE determines that the MCCH changes.

For example, if the change identifier is the NDI, and if an NDI obtained by the UE is 1 and an NDI in the previous modification period is 0, the UE determines that the MCCH changes. For another example, if the change identifier is a process number HARQ, and if a process number HARQ obtained by the UE is 1 and the first preset value is 1 to 7, the UE determines that the MCCH changes. For another example, the change identifier is the change identifier in the change identifier field of the PDCCH or the EPDCCH, and if a change identifier that is in the change identifier field of the PDCCH or the EPDCCH and that is obtained by the UE is 1 and a change identifier in the change identifier field of the PDCCH or the EPDCCH in the previous modification period is 0, the UE determines that the MCCH changes. For another example, if the change identifier is the combination of the NDI and the process number HARQ, and if a value that is of the combination of the NDI and the process number HARQ and that is obtained by the UE is 1 and the first preset value is 1 to 15, the UE determines that the MCCH changes.

Alternatively, the UE determines an MCCH modification period of the MCCH and an M-RNTI corresponding to the MCCH modification period; the UE reads, in a non-MBSFN subframe, a change notification field included on a PDCCH corresponding to the M-RNTI; and if a bit value corresponding to the MCCH in the change notification field is the same as a second preset value, the UE determines that the MCCH changes.

For example, the change notification field is a change notification field including eight bits and each bit corresponds to one MCCH. If a bit value corresponding to the MCCH in the bit change notification field is 1 and the second preset value is 1, the UE determines that the MCCH changes.

In this embodiment of the present disclosure, a specific implementation of determining, by the UE, the MCCH modification period of the MCCH is as follows:

If the MCCH sending period information includes only one MCCH modification period, the UE determines the MCCH modification period as the MCCH modification period; or if the MCCH sending period information includes multiple MCCH modification periods and each MCCH modification period has a period selection parameter corresponding to the MCCH modification period, the UE determines the MCCH modification period according to the MCCH period selection parameter and a multicast service that needs to be read by the UE. For example, there are two MCCH modification periods, a multicast service type corresponding to one MCCH modification period is a low-delay service, a multicast service type corresponding to the other MCCH modification period is a non-low-delay service. If a service that needs to be read by the UE is a low-delay service, the UE determines the modification period corresponding to the low-delay service as the MCCH modification period. If the MCCH configuration information includes multiple MCCHs, each MCCH has multiple MCCH modification periods, and each MCCH has an MCCH selection parameter corresponding to the MCCH, the UE determines, according to the MCCH selection parameter and a multicast service that needs to be read by the UE, an MCCH that needs to be read, and the UE determines the MCCH modification period according to an MCCH period selection parameter and the multicast service that needs to be read by the UE. For example, the MCCH configuration information includes two MCCHs, a multicast service type corresponding to an $MCCH_1$ is a low-delay service, and a multicast service type corresponding to an $MCCH_2$ is a non-low-delay service. If a service that needs to be read by the UE is a low-delay service, the MCCH read by the UE is the $MCCH_1$. The $MCCH_1$ has two MCCH modification periods, a multicast service type corresponding to one MCCH modification period is a low-delay service, and a multicast service type corresponding to the other MCCH modification period is a non-low-delay service. If the service that needs to be read by the UE is the low-delay service, the UE determines the modification period corresponding to the low-delay service as the MCCH modification period.

Figure 7:
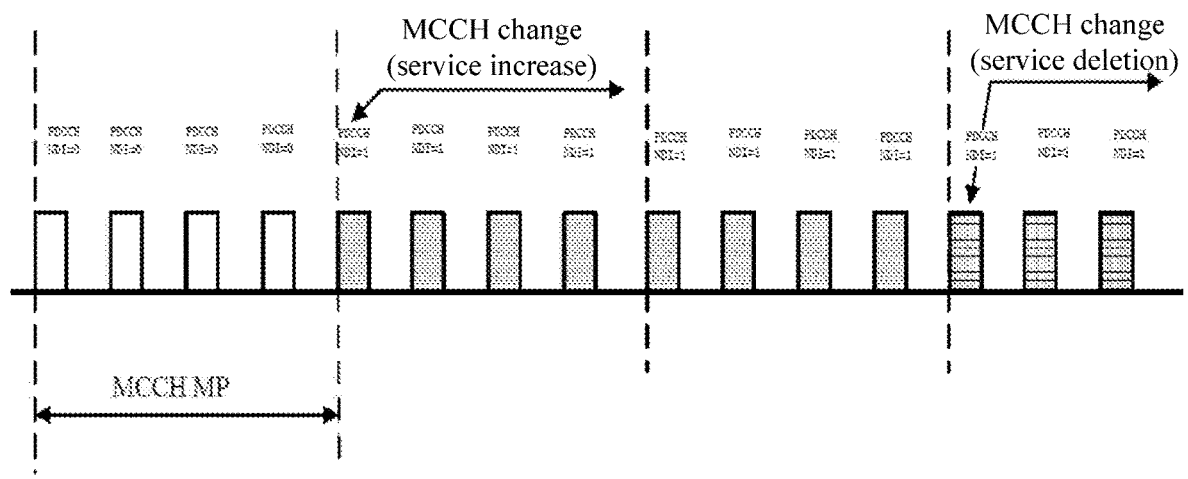

In this embodiment of the present disclosure, if the UE determines that the MCCH changes, the UE re-reads the MCCH message according to the MCCH configuration information. The UE re-reads, according to the MCCH configuration information, the MCCH message in a current MCCH modification period in which it is determined that the MCCH changes. As shown in FIG. 6, an NDI initially read by the UE is equal to 0 and an NDI read in a next modification period is equal to 1, and the UE determines that the MCCH message changes and starts reading a new MCCH in the current modification period. Alternatively, the UE re-reads, according to the MCCH configuration information, the MCCH message in a next MCCH modification period of a current MCCH modification period in which it is determined that the MCCH changes. As shown in FIG. 7, an NDI initially read by the UE is equal to 0 and an NDI read in a next modification period is equal to 1, and the UE determines that the MCCH message is going to change and starts reading a new MCCH in the next modification period of the current modification period.

In this embodiment of the present disclosure, a specific implementation of sending, by the base station, the change notification of the MCCH is:

determining, by the base station, an MCCH modification period of the MCCH; and sending a change identifier on the PDCCH or the EPDCCH in the MCCH modification period according to the MCCH-RNTI, where the change identifier includes an NDI and/or a process number, the change identifier is different from a change identifier in a previous modification period or the change identifier is a change identifier of a first preset value, and the change identifier is the same as the change identifier determined by the UE, and details are not described herein again; or determining, by the base station, an MCCH modification period of the MCCH and an M-RNTI corresponding to the MCCH modification period; and sending a bit value in a change notification field corresponding to the MCCH, where the bit value is the same as a second preset value, and the change notification field corresponding to the MCCH is a change notification field included on a PDCCH corresponding to the M-RNTI in a non-MBSFN subframe.

In this embodiment of the present disclosure, a specific implementation of determining, by the base station, the MCCH modification period of the MCCH is the same as the specific implementation of determining, by the UE, the MCCH modification period of the MCCH. For a specific implementation process, refer to the specific implementation process of determining, by the UE, the MCCH modification period of the MCCH, and details are not described herein again.

Figure 8:
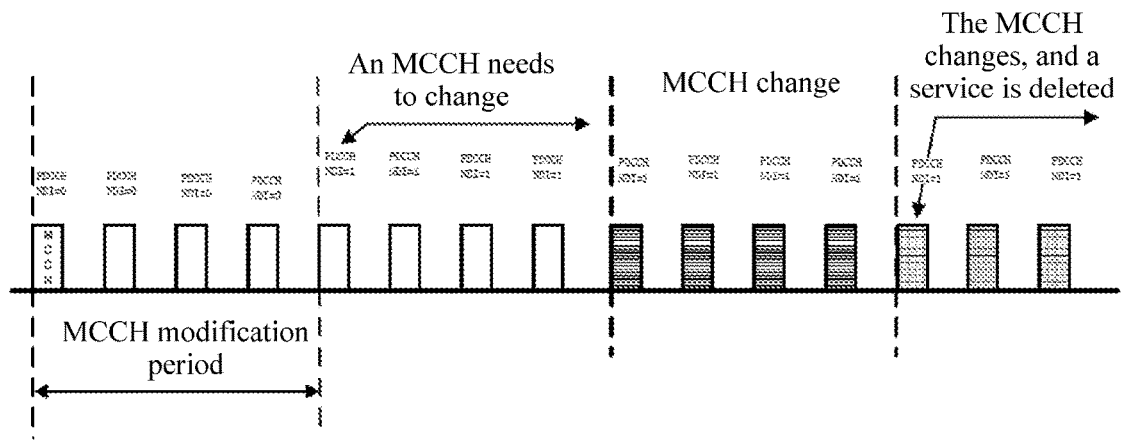

In this embodiment of the present disclosure, if the base station determines that the MCCH changes, the base station resends the MCCH message according to the MCCH configuration information. The base station resends, according to the MCCH configuration information, the MCCH message in a current MCCH modification period in which it is determined that the MCCH changes. As shown in FIG. 7, an initial NDI is equal to 0 and an NDI sent by the base station in a next modification period is equal to 1, and the base station starts sending a new MCCH in the current modification period. Alternatively, the UE re-reads, according to the MCCH configuration information, the MCCH message in a next MCCH modification period of a current MCCH modification period in which it is determined that the MCCH changes. As shown in FIG. 8, an initially read NDI is equal to 0 and an NDI sent by the base station in the next modification period is equal to 1, and the base station starts sending a new MCCH in the next modification period of the current modification period.

Figure 9:
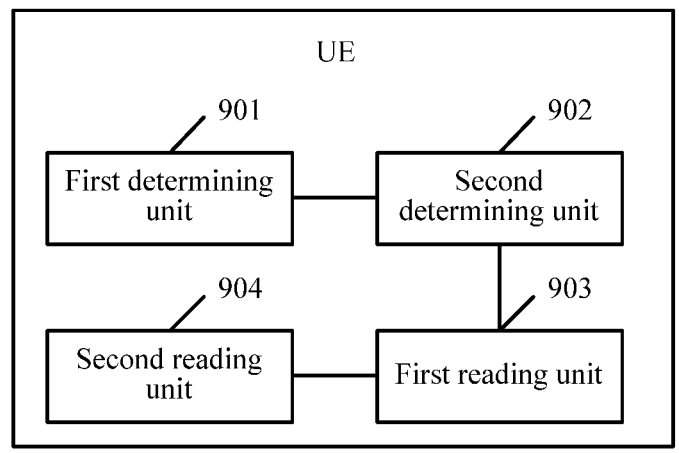
FIG. 9 is a schematic structural diagram of a first embodiment of UE according to an embodiment of the present disclosure.

Referring to FIG. 9, FIG. 9 is a schematic structural diagram of user equipment UE according to an embodiment of the present disclosure. The UE includes:

a first determining unit 901, configured to determine MCCH configuration information, where the MCCH configuration information includes an MCCH-RNTI and MCCH sending period information, where the MCCH configuration information includes at least one of pre-defined configuration information, or configuration information that is sent by a base station to the UE by using a system broadcast message; and a second determining unit 902, configured to determine MCCH sending time information according to the MCCH sending period information.

The MCCH sending period information includes an MCCH repetition period and an offset parameter for sending an MCCH, and the second determining unit 902 is specifically configured to determine, according to the MCCH repetition period and the offset parameter for sending the MCCH, a subframe location corresponding to a time of sending the MCCH.

If in each MCCH repetition period, there is only one subframe for sending the MCCH, the second determining unit 902 is specifically configured to determine, according to a system frame number, a subframe number, the MCCH repetition period, and the offset parameter for sending the MCCH, the subframe location corresponding to the time of sending the MCCH.

If in each MCCH repetition period, there are multiple candidate subframes for sending the MCCH, the second determining unit 902 is specifically configured to determine, according to a system frame number, the MCCH repetition period, and the offset parameter of the MCCH, a subframe location set corresponding to the time of sending the MCCH.

The second determining unit 902 is specifically configured to: determine, according to the system frame number, the MCCH repetition period, and the offset parameter of the MCCH, a frame for sending the MCCH; and determine, according to MCCH subframe set configuration information and the frame for sending the MCCH, the subframe location set corresponding to the MCCH sending time information.

The MCCH subframe set configuration information is carried in MCCH configuration signaling that is sent by the base station to the UE, and the MCCH configuration signaling is a system broadcast message or dedicated signaling of the UE.

The MCCH subframe set configuration information includes an MCCH subframe sequence, or the MCCH subframe set configuration information includes an MCCH subframe starting location, or the MCCH subframe set configuration information includes the MCCH subframe starting location and sending duration information.

The MCCH subframe sequence is a bitmap sequence, and the second determining unit 902 is specifically configured to determine, according to the frame for sending the MCCH, a value of each bit in the bitmap sequence, and a subframe number corresponding to each bit in the bitmap sequence, the subframe location set corresponding to the MCCH sending time information.

The MCCH subframe set configuration information includes the MCCH subframe starting location, the subframe location set corresponding to the MCCH sending time information includes one subframe, and the subframe is a subframe corresponding to the MCCH subframe starting location.

The MCCH subframe set configuration information includes the MCCH subframe starting location and the sending duration information, and the second determining unit 902 is specifically configured to:

determine, according to the sending duration information, a total quantity of subframes for sending the MCCH; and determine, according to the total quantity of subframes for sending the MCCH and a starting subframe for sending the MCCH, all subframes for sending the MCCH; or determine, according to the total quantity of subframes for sending the MCCH, a starting subframe for sending the MCCH, and an MBSFN subframe configuration, all subframes for sending the MCCH.

Optionally, the UE shown in FIG. 9 further includes:

a third determining unit, configured to: determine the starting subframe according to the MCCH subframe set configuration information, and use the starting subframe as a subframe of an MCCH change notification; or a fourth determining unit, configured to: determine, according to the MCCH subframe set configuration information, all subframes for sending the MCCH, and use any subframe in all the subframes for sending the MCCH as a subframe of an MCCH change notification;

a first reading unit 903, configured to read an MCCH message according to the MCCH sending time information by using the MCCH-RNTI, where the MCCH message includes configuration information of a multicast service, where the first reading unit 903 is specifically configured to: read, by using the MCCH-RNTI, a physical downlink control channel PDCCH or an enhanced physical downlink control channel EPDCCH in the subframe location corresponding to the time of sending the MCCH; and read the MCCH message in a specified MCCH message resource location on the PDCCH or the EPDCCH; and a second reading unit 904, configured to read the multicast service according to the configuration information of the multicast service.

The configuration information of the multicast service includes a temporary multicast group identifier and a G-RNTI for scheduling the multicast service, and the second reading unit 904 is specifically configured to read, according to the G-RNTI for scheduling the multicast service, the multicast service corresponding to the temporary multicast group identifier.

The second reading unit 904 is specifically configured to: read PDCCH scheduling information according to the G-RNTI of the multicast service; and determine, according to the PDCCH scheduling information, a frequency resource and a modulation scheme that are corresponding to the multicast service corresponding to the temporary multicast group identifier, and read the multicast service according to the frequency resource and the modulation scheme.

The configuration information of the multicast service includes a temporary multicast group identifier and scheduling information of the multicast service, and the second reading unit 904 is specifically configured to read, according to the scheduling information of the multicast service, the multicast service corresponding to the temporary multicast group identifier.

Optionally, after the first determining unit 901 determines the MCCH configuration information, the UE shown in FIG. 9 further includes: a fifth determining unit, configured to determine whether the MCCH changes; and a third reading unit, configured to: if it is determined that the MCCH changes, re-read the MCCH message according to the MCCH configuration information.

The fifth determining unit is specifically configured to: determine an MCCH modification period of the MCCH; read the PDCCH or the EPDCCH in the MCCH modification period according to the MCCH-RNTI, to obtain an MCCH change identifier on the PDCCH or the EPDCCH, where the change identifier includes any one of the following change identifiers: a change identifier in a change identifier field of the PDCCH or the EPDCCH, an NDI, a process number, or a combination of an NDI and a process number; and if the MCCH change identifier is different from a change identifier in a previous modification period, determine that the MCCH changes; or if the MCCH change identifier is the same as a first preset value, determine that the MCCH changes.

The fifth determining unit is further specifically configured to: determine an MCCH modification period of the MCCH and an M-RNTI corresponding to the MCCH modification period; read, in a non-MBSFN subframe, a change notification field included on a PDCCH corresponding to the M-RNTI; and if a bit value corresponding to the MCCH in the change notification field is the same as a second preset value, determine that the MCCH changes.

The third reading unit is specifically configured to: re-read, according to the MCCH configuration information, the MCCH message in a current MCCH modification period in which it is determined that the MCCH changes; or re-read, according to the MCCH configuration information, the MCCH message in a next MCCH modification period of a current MCCH modification period in which it is determined that the MCCH changes.

The fifth determining unit is further specifically configured to: if the MCCH sending period information includes only one MCCH modification period, determine the MCCH modification period as the MCCH modification period; or if the MCCH sending period information includes multiple MCCH modification periods and each MCCH modification period has a period selection parameter corresponding to the MCCH modification period, determine the MCCH modification period according to the MCCH period selection parameter and a multicast service that needs to be read by the UE; or if the MCCH configuration information includes multiple MCCHs, each MCCH has multiple MCCH modification periods, and each MCCH has an MCCH selection parameter corresponding to the MCCH, determine, according to the MCCH selection parameter and a multicast service that needs to be read by the UE, an MCCH that needs to be read, and determine the MCCH modification period according to an MCCH period selection parameter and the multicast service that needs to be read by the UE.

It may be understood that functions of the functional modules of the UE in this embodiment may be specifically implemented according to the method in the method embodiment. For a specific implementation process, refer to the method embodiment.

It can be learned that, in this embodiment of the present disclosure, the first determining unit 901 determines the MCCH configuration information, where the configuration information includes the MCCH-RNTI and the MCCH sending period information; the second determining unit 902 determines the MCCH sending time information according to the MCCH sending period information; the first reading unit 903 reads the MCCH message according to the MCCH sending time information by using the MCCH-RNTI, where the MCCH message includes the configuration information of the multicast service; and the second reading unit 904 reads the multicast service according to the configuration information of the multicast service. In this embodiment of the present disclosure, the UE identifies an MCCH in a subframe by configuring an MCCH-RNTI. Therefore, the MCCH can be transmitted in any subframe and is not restricted to being transmitted only in an MBSFN subframe, so that another non-MBSFN subframe can also be used to transmit the MCCH. Therefore, MCCHs may not be all transmitted in MBSFN subframes, so that some MBSFN subframes may not be used to transmit the MCCHs but are all used to transmit MBSFN service data related to the UE, so as to reduce waste of the MBSFN subframes.

Figure 10:
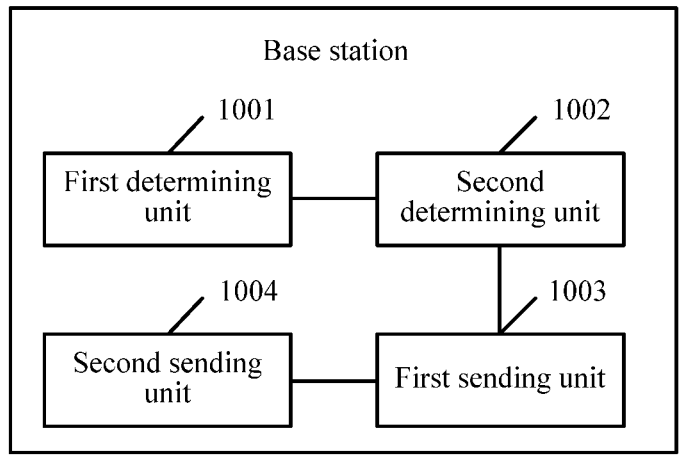
FIG. 10 is a schematic structural diagram of a first embodiment of a base station according to an embodiment of the present disclosure.

Referring to FIG. 10, FIG. 10 is a schematic structural diagram of a base station according to an embodiment of the present disclosure. The base station includes:

a first determining unit 1001, configured to determine MCCH configuration information, where the MCCH configuration information includes an MCCH-RNTI and MCCH sending period information; and a second determining unit 1002, configured to determine MCCH sending time information according to the MCCH sending period information.

The MCCH sending period information includes an MCCH repetition period and an offset parameter for sending an MCCH, and the second determining unit 1002 is specifically configured to determine, according to the MCCH repetition period and the offset parameter for sending the MCCH, a subframe location corresponding to a time of sending the MCCH.

If in each MCCH repetition period, there is only one subframe for sending the MCCH, the second determining unit 1002 is specifically configured to determine, according to a system frame number, a subframe number, the MCCH repetition period, and the offset parameter for sending the MCCH, the subframe location corresponding to the time of sending the MCCH.

If in each MCCH repetition period, there are multiple candidate subframes for sending the MCCH, the second determining unit 1002 is specifically configured to determine, according to a system frame number, the MCCH repetition period, and the offset parameter of the MCCH, a subframe location corresponding to the time of sending the MCCH.

The second determining unit 1002 is specifically configured to:

determine, according to the system frame number, the MCCH repetition period, and the offset parameter of the MCCH, a frame for sending the MCCH; and determine, according to MCCH subframe set configuration information and the frame for sending the MCCH, the subframe location set corresponding to the MCCH sending time information.

The MCCH subframe set configuration information is determined by the base station according to a subframe of an MCCH that needs to be sent.

If the MCCH subframe set configuration information is determined by the base station according to a subframe location of the MCCH that needs to be sent, the subframe set configuration information includes an MCCH subframe sequence. If there is one subframe of the MCCH that needs to be sent, the subframe set configuration information includes an MCCH subframe starting location. If there are multiple subframes of the MCCH that needs to be sent, the subframe set configuration information includes an MCCH subframe starting location and sending duration information.

The MCCH subframe sequence is a bitmap sequence, and the second determining unit 1002 is specifically configured to:

determine, according to the frame for sending the MCCH, a value of each bit in the bitmap sequence, and a subframe number corresponding to each bit in the bitmap sequence, the subframe location set corresponding to the MCCH sending time information.

The MCCH subframe set configuration information includes the MCCH subframe starting location, the subframe location set corresponding to the MCCH sending time information includes one subframe, and the subframe is a subframe corresponding to the MCCH subframe starting location.

The MCCH subframe set configuration information includes the MCCH subframe starting location and the sending duration information, and the second determining unit 1002 is specifically configured to:

determine, according to the sending duration information, a total quantity of subframes for sending the MCCH; and determine, according to the total quantity of subframes for sending the MCCH and a starting subframe for sending the MCCH, all subframes for sending the MCCH; or determine, by the UE according to the total quantity of subframes for sending the MCCH, a starting subframe for sending the MCCH, and an MBSFN subframe configuration, all subframes for sending the MCCH.

Optionally, the base station shown in FIG. 10 further includes:

a third determining unit, configured to: determine the starting subframe according to the MCCH subframe set configuration information, and use the starting subframe as a subframe of an MCCH change notification; or a fourth determining unit, configured to: determine, according to the MCCH subframe set configuration information, all the subframes for sending the MCCH, and use any subframe in all the subframes for sending the MCCH as a subframe of an MCCH change notification;

a first sending unit 1003, configured to send an MCCH message according to the MCCH sending time information by using the MCCH-RNTI, where the MCCH message includes configuration information of a multicast service, where the first sending unit 1003 is specifically configured to: send, by using the MCCH-RNTI, a physical downlink control channel PDCCH or an enhanced physical downlink control channel EPDCCH in the subframe location corresponding to the time of sending the MCCH; and send the MCCH message in a specified MCCH message resource location on the PDCCH or the EPDCCH; and a second sending unit 1004, configured to send the multicast service according to the configuration information of the multicast service.

The configuration information of the multicast service includes a temporary multicast group identifier and a G-RNTI for scheduling the multicast service, and the second sending unit 1004 is specifically configured to send, according to the G-RNTI for scheduling the multicast service, the multicast service corresponding to the temporary multicast group identifier.

The second sending unit 1004 is specifically configured to: determine a frequency resource and a modulation scheme that are of the multicast service corresponding to the temporary multicast group identifier; and send PDCCH scheduling information to UE according to the G-RNTI of the multicast service, where the PDCCH scheduling information carries the frequency resource and the modulation scheme, and send the multicast service according to the frequency resource and the modulation scheme.

The configuration information of the multicast service includes a temporary multicast group identifier and scheduling information of the multicast service, and the second sending unit 1004 is specifically configured to send, according to the scheduling information of the multicast service, the multicast service corresponding to the temporary multicast group identifier.

Optionally, after the first determining unit 1001 determines the MCCH configuration information, the base station shown in FIG. 10 further includes: a third sending unit, configured to: if it is determined that the MCCH changes, send a change notification of the MCCH; and a fourth sending unit, configured to resend the MCCH message according to the MCCH configuration information.

The third sending unit is specifically configured to: determine an MCCH modification period of the MCCH; and send a change identifier on the PDCCH or the EPDCCH in the MCCH modification period according to the MCCH-RNTI, where the change identifier includes any one of the following change identifiers: a change identifier in a change identifier field of the PDCCH or the EPDCCH, an NDI, a process number, or a combination of an NDI and a process number, and the change identifier is different from a change identifier in a previous modification period or the change identifier is a change identifier of a first preset value.

The third sending unit is specifically configured to: determine an MCCH modification period of the MCCH and an M-RNTI corresponding to the MCCH modification period; and send a bit value in a change notification field corresponding to the MCCH, where the bit value is the same as a second preset value, and the change notification field corresponding to the MCCH is a change notification field included on a PDCCH corresponding to the M-RNTI in a non-MBSFN subframe.

The fourth sending unit is specifically configured to: resend, according to the MCCH configuration information, the MCCH message in a current MCCH modification period in which it is determined that the MCCH changes; or resend, according to the MCCH configuration information, the MCCH message in a next MCCH modification period of a current MCCH modification period in which it is determined that the MCCH changes.

The third sending unit is specifically configured to: if the MCCH sending period information includes only one MCCH modification period, determine the MCCH modification period as the MCCH modification period; or if the MCCH sending period information includes multiple MCCH modification periods and each MCCH modification period has a period selection parameter corresponding to the MCCH modification period, determine the MCCH modification period according to the MCCH period selection parameter and a multicast service that needs to be sent by the base station; or if the MCCH configuration information includes multiple MCCHs, each MCCH has multiple MCCH modification periods, and each MCCH has an MCCH selection parameter corresponding to the MCCH, determine, according to the MCCH selection parameter and a multicast service that needs to be sent by the base station, an MCCH that needs to be sent, and determine the MCCH modification period according to an MCCH period selection parameter and the multicast service that needs to be sent by the base station.

Optionally, the MCCH configuration information includes at least one of pre-defined configuration information, or configuration information that is sent by an MCE to the base station.

It may be understood that functions of the functional modules of the base station in this embodiment may be specifically implemented according to the method in the method embodiment. For a specific implementation process, refer to the method embodiment.

It can be learned that, in this embodiment of the present disclosure, the first determining unit 1001 determines the MCCH configuration information, where the MCCH configuration information includes the MCCH-RNTI and the MCCH sending period information; the second determining unit 1002 determines the MCCH sending time information according to the MCCH sending period information; the first sending unit 1003 sends the MCCH message according to the MCCH sending time information by using the MCCH-RNTI, where the MCCH message includes the configuration information of the multicast service; and the second sending unit 1004 sends the multicast service according to the configuration information of the multicast service. In this embodiment of the present disclosure, the UE identifies an MCCH in a subframe by configuring an MCCH-RNTI. Therefore, the MCCH can be transmitted in any subframe and is not restricted to being transmitted only in an MBSFN subframe, so that another non-MBSFN subframe can also be used to transmit the MCCH. Therefore, MCCHs may not be all transmitted in MBSFN subframes, so that some MBSFN subframes may not be used to transmit the MCCHs but are all used to transmit MBSFN service data related to the UE, so as to reduce waste of the MBSFN subframes.

Figure 11:
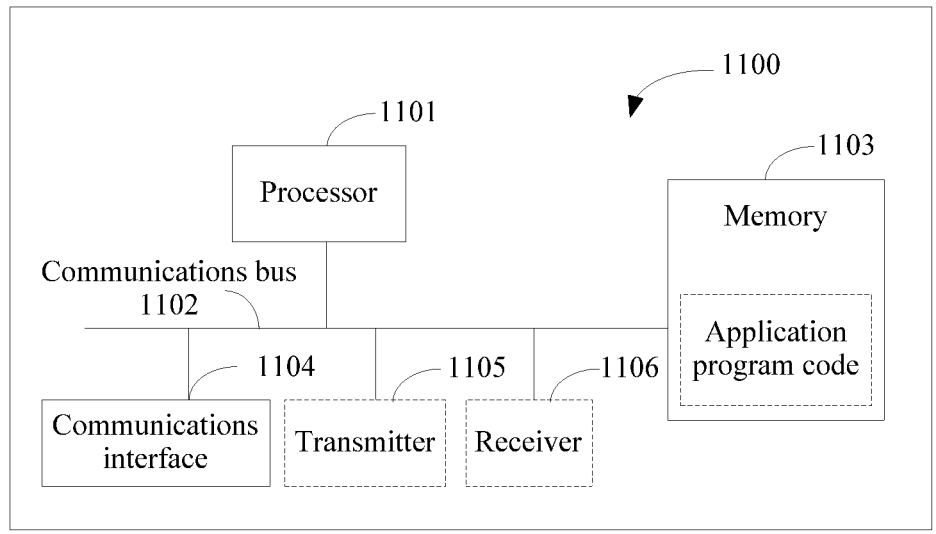
FIG. 11 is a schematic structural diagram of a second embodiment of UE according to an embodiment of the present disclosure.

FIG. 11 is a schematic diagram of UE 1100 according to an embodiment of the present disclosure. The UE 1100 includes at least one processor 1101, a communications bus 1102, a memory 1103, at least one communications interface 1104, a transmitter 1105, and a receiver 1106.

The processor 1101 may be a general-purpose central processing unit (CPU), a microprocessor, an application-specific integrated circuit (ASIC), or one or more integrated circuits configured to control execution of a program of the solutions of the present disclosure.

The communications bus 1102 may include a path for transmitting information between the components. The communications interface 1104 is applicable to any transceiver-type apparatus, and is configured to communicate with another device or a communications network such as the Ethernet, a radio access network (RAN), or a wireless local area network (WLAN).

The memory 1103 may be a read-only memory (ROM) or another type of static storage device that can store static information and an instruction, a random access memory (RAM) or another type of dynamic storage device that can store information and an instruction, an electrically erasable programmable read-only memory (EEPROM), a compact disc read-only memory (CD-ROM) or another optical disk storage, an optical disc storage (including a compact disc, a laser disc, an optical disc, a digital versatile disc, a Blu-ray disc, or the like), a magnetic disk storage medium or another magnetic storage device, or any other medium that can carry or store expected program code in a form of an instruction or a data structure and that can be accessed by a computer, but is not limited thereto. The memory may independently exist and be connected to the processor by using the bus. Alternatively, the memory may be integrated with the processor.

The memory 1103 is configured to store disclosure program code for performing the solutions of the present disclosure, and the execution is controlled by the processor 1101. The processor 1101 is configured to execute the disclosure program code stored in the memory 1103.

The code stored in the memory 1103 of the UE shown in FIG. 11 may be used to perform the multicast service reading method provided in the present disclosure, for example, to determine multicast control channel MCCH configuration information, where the MCCH configuration information includes a multicast control channel-radio network temporary identifier MCCH-RNTI and MCCH sending period information; determine MCCH sending time information according to the MCCH sending period information; read an MCCH message according to the MCCH sending time information by using the MCCH-RNTI, where the MCCH message includes configuration information of a multicast service; and at last, read the multicast service according to the configuration information of the multicast service.

During specific implementation, in an embodiment, the UE 1100 may further include the transmitter 1105 and the receiver 1106. The transmitter 1105 communicates with the processor 1101, and may display information in multiple manners. The receiver 1106 communicates with the processor 1101, and may receive, in multiple manners, signaling sent by an disclosure server or a service layer apparatus.

The UE 1100 may be a general-purpose computer device or a special-purpose computer device. During specific implementation, the computer device 1100 may be a desktop computer, a portable computer, a network server, a palmtop computer (e.g. Personal Digital Assistant (PDA)), a mobile phone, a tablet computer, a wireless terminal device, a communications device, an embedded device, or a device having a structure similar to that in FIG. 11. A type of the UE 1100 is not limited in this embodiment of the present disclosure.

Figure 12:
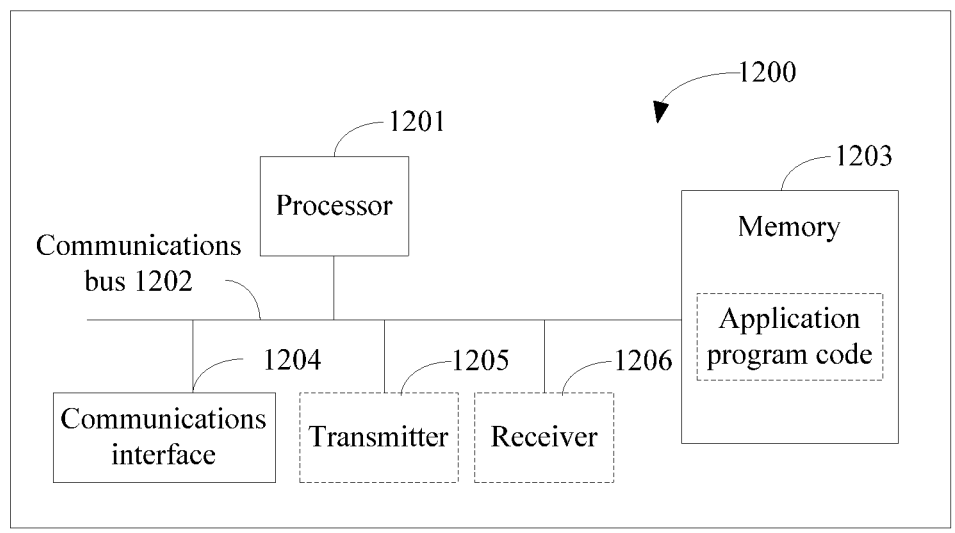
FIG. 12 is a schematic structural diagram of a second embodiment of a base station according to an embodiment of the present disclosure.

FIG. 12 is a schematic diagram of a base station 1200 according to an embodiment of the present disclosure. The base station 1200 includes at least one processor 1201, a communications bus 1202, a memory 1203, at least one communications interface 1204, a transmitter 1205, and a receiver 1206.

The processor 1201 may be a general-purpose central processing unit (CPU), a microprocessor, an application-specific integrated circuit (ASIC), or one or more integrated circuits configured to control execution of a program of the solutions of the present disclosure.

The communications bus 1202 may include a path for transmitting information between the components. The communications interface 1204 is applicable to any transceiver-type apparatus, and is configured to communicate with another device or a communications network such as the Ethernet, a radio access network (RAN), or a wireless local area network (WLAN).

The memory 1203 may be a read-only memory (ROM) or another type of static storage device that can store static information and an instruction, a random access memory (RAM) or another type of dynamic storage device that can store information and an instruction, an electrically erasable programmable read-only memory (EEPROM), a compact disc read-only memory (CD-ROM) or another optical disk storage, an optical disc storage (including a compact disc, a laser disc, an optical disc, a digital versatile disc, a Blu-ray disc, or the like), a magnetic disk storage medium or another magnetic storage device, or any other medium that can carry or store expected program code in a form of an instruction or a data structure and that can be accessed by a computer, but is not limited thereto. The memory may independently exist and be connected to the processor by using the bus. Alternatively, the memory may be integrated with the processor.

The memory 1203 is configured to store disclosure program code for performing the solutions of the present disclosure, and the execution is controlled by the processor 1201. The processor 1201 is configured to execute the disclosure program code stored in the memory 1203.

The code stored in the memory 1203 of the base station shown in FIG. 12 may be used to perform the multicast service sending method provided in the present disclosure, for example, to determine MCCH configuration information, where the MCCH configuration information includes an MCCH-RNTI and MCCH sending period information; determine MCCH sending time information according to the MCCH sending period information; send an MCCH message according to the MCCH sending time information by using the MCCH-RNTI, where the MCCH message includes configuration information of a multicast service; and at last, send the multicast service according to the configuration information of the multicast service.

During specific implementation, in an embodiment, the base station 1200 may further include the transmitter 1205 and the receiver 1206. The transmitter 1205 communicates with the processor 1201, and may display information in multiple manners. The receiver 1206 communicates with the processor 1201, and may receive, in multiple manners, signaling sent by an disclosure server or a service layer apparatus.

An embodiment of the present disclosure further provides a computer storage medium. The computer storage medium may store a program, and when the program is executed, a part or all of the steps of any multicast service reading method recorded in the foregoing method embodiments may be performed.

An embodiment of the present disclosure further provides a computer storage medium. The computer storage medium may store a program, and when the program is executed, a part or all of the steps of any multicast service sending method recorded in the foregoing method embodiments may be performed.

It should be noted that, to make the description brief, the foregoing method embodiments are expressed as a series of actions. However, a person skilled in the art should know that the present disclosure is not limited to the described action sequence, because according to the present disclosure, some steps may be performed in another sequence or performed simultaneously. In addition, a person skilled in the art should also know that all the embodiments described in the specification are example embodiments, and the related actions and modules are not necessarily mandatory to the present disclosure.

In the foregoing embodiments, the description of each embodiment has respective focuses. For a part that is not described in detail in an embodiment, refer to related descriptions in other embodiments.

In the several embodiments provided in this disclosure, it should be understood that the disclosed apparatus may be implemented in other manners. For example, the described apparatus embodiment is merely an example. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic or other forms.

The modules described as separate parts may or may not be physically separate, and parts displayed as modules may or may not be physical modules, may be located in one position, or may be distributed on a plurality of network modules. Some or all of the modules may be selected according to actual needs to achieve the objectives of the solutions of the embodiments.

In addition, functional modules in the embodiments of the present disclosure may be integrated into one processing module, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated module may be stored in a computer-readable memory. Based on such an understanding, the technical solutions of the present disclosure essentially, or the part contributing to the prior art, or all or a part of the technical solutions may be implemented in a form of a software product. The software product is stored in a memory and includes several instructions for instructing a computer device (which may be a personal computer, a server, a network device, or the like) to perform all or a part of the steps of the methods described in the embodiments of the present disclosure. The foregoing memory includes: any medium that can store program code, such as a USB flash drive, a read-only memory (ROM), a random access memory (RAM), a removable hard disk, a magnetic disk, or an optical disc.

A person of ordinary skill in the art may understand that all or some of the steps of the methods in the embodiments may be implemented by a program instructing relevant hardware. The program may be stored in a computer readable memory. The memory may include a flash memory, a read-only memory (ROM), a random access memory (RAM), a magnetic disk, an optical disc, or the like.

The embodiments of the present disclosure are described in detail above. The principle and implementation of the present disclosure are described herein by using specific examples. The description about the embodiments of the present disclosure is merely provided to help understand the method and core ideas of the present disclosure. In addition, a person of ordinary skill in the art can make variations and modifications to the present disclosure in terms of specific implementations and disclosure scopes according to the ideas of the present disclosure. Therefore, the content in this specification shall not be construed as a limit to the present disclosure.

What is claimed is:

1. A method for a multicast service by a user equipment, comprising:
   determining according to a multicast control channel (MCCH) repetition period and an offset parameter, a system frame number corresponding to a frame for an MCCH;
   determining a subframe location for the MCCH according to an MCCH subframe starting location, comprising:
      determining whether MCCH sending duration information for the MCCH is configured from a base station; and
      determining the subframe location by the MCCH subframe starting location and the MCCH sending duration information when the MCCH sending duration information is configured from the base station;
   retrieving an MCCH message according to the subframe location and the frame corresponding to the system frame number, the MCCH message comprising configuration information of a multicast service;
   receiving the multicast service according to the configuration information;
   determining the MCCH changes in a current MCCH modification period; and
   retrieving a new MCCH message according to the determination that the MCCH changes, the new MCCH message being retrieved according to the MCCH repetition period and the offset parameter in the current MCCH modification period.

2. The method according to claim 1, wherein the MCCH subframe starting location is carried from the base station in a system broadcast message or in a dedicated signaling.

3. The method according to claim 1, wherein when the subframe location depends on the MCCH subframe starting location and the MCCH sending duration information, the determining the subframe location comprises:
   determining, according to the MCCH sending duration information, a quantity of subframes for the MCCH; and
   determining all subframes for the MCCH according to the quantity of the subframes, the MCCH starting subframe location, the frame corresponding to the system frame number, and a multimedia broadcast multicast service single frequency network (MBSFN) subframe configuration.

4. The method according to claim 1, wherein the method further comprises:
   determining a subframe of an MCCH change notification is a starting subframe corresponding to the MCCH subframe starting location.

5. A method for a multicast service by a base station, comprising:
   determining a system frame number corresponding to a frame for a multicast control channel (MCCH) according to an MCCH repetition period and an offset parameter;
   when a subframe location for the MCCH is determined only by an MCCH subframe starting location, sending a configuration of an MCCH subframe starting location without a configuration of MCCH sending duration information for the MCCH;
   when the subframe location for the MCCH is determined by the MCCH subframe starting location and the MCCH sending duration information, sending the configuration of an MCCH subframe starting location and the configuration of the MCCH sending duration information;
   sending an MCCH message according to the subframe location and the frame, the MCCH message comprising configuration information of a multicast service;
   sending the multicast service according to the configuration information;
   sending a new MCCH message according to the MCCH repetition period and the offset parameter in a current MCCH modification period in which the base station determines the MCCH changes.

6. The method according to claim 5, wherein when the subframe location depends on the MCCH subframe starting location and the MCCH sending duration information, the determining the subframe location comprises:

determining, according to the MCCH sending duration information, a quantity of subframes for the MCCH; and determining all subframes for the MCCH according to the quantity of subframes, the frame, a starting subframe, and a multimedia broadcast multicast service single frequency network (MBSFN) subframe configuration.

7. The method according to claim 5, wherein the method further comprises:

determining a subframe of an MCCH change notification corresponding to the MCCH subframe starting location.

8. An apparatus, comprising:

a processing circuit configured to:

determine according to a multicast control channel (MCCH) repetition period and an offset parameter, a system frame number corresponding to a frame for an MCCH;

determine a subframe location for the MCCH according to an MCCH subframe starting location, comprising:

determine whether MCCH sending duration information for the MCCH is configured from a base station; and determine the subframe location by the MCCH subframe starting location and the MCCH sending duration information when the MCCH sending duration information is configured from the base station;

retrieve an MCCH message according to the subframe location and the frame corresponding to the system frame number, wherein the MCCH message comprises configuration information of a multicast service; and a receiving circuit coupled with the processing circuit, the receiving circuit configured to receive the multicast service according to the configuration information;

the processing circuit is further configured to:

determine the MCCH changes in a current MCCH modification period; and retrieving a new MCCH message according to the determination that the MCCH changes, the new MCCH message being retrieved according to the MCCH repetition period and the offset parameter in the current MCCH modification period.

9. The apparatus according to claim 8, wherein the MCCH subframe starting location is carried from the base station in a system broadcast message or in a dedicated signaling.

10. The apparatus according to claim 8, wherein when the subframe location depends on the MCCH subframe starting location and the MCCH sending duration information, the determination of the subframe location comprises:

determine, according to the MCCH sending duration information, a quantity of subframes for the MCCH; and determine all subframes for the MCCH, according to the quantity of the subframes, the MCCH starting subframe location, the frame corresponding to the system frame number, and a multimedia broadcast multicast service single frequency network (MBSFN) subframe configuration.

11. The apparatus according to claim 8, wherein the processing circuit is further configured to:

determine a subframe of an MCCH change notification is a starting subframe corresponding to the MCCH subframe starting location.

12. An apparatus, comprising:

a processing circuit configured to:

determine a system frame number corresponding to a frame for a multicast control channel (MCCH) according to an MCCH repetition period and an offset parameter;

a transmitting circuit coupled to the processing circuit, the transmitting circuit configured to:

when a subframe location for the MCCH is determined only by an MCCH subframe starting location, send a configuration of an MCCH subframe starting location without a configuration of MCCH sending duration information for the MCCH;

when the subframe location for the MCCH is determined by the MCCH subframe starting location and the MCCH sending duration information, send the configuration of an MCCH subframe starting location and the configuration of the MCCH sending duration information;

send an MCCH message according to the subframe location and the frame, the MCCH message comprising configuration information of a multicast service; and send the multicast service according to the configuration information wherein the transmitting circuit is further configured to:

send a new MCCH message according to the MCCH repetition period and the offset parameter in a current MCCH modification period in which the apparatus determines the MCCH changes.

13. The apparatus according to claim 12, wherein when the subframe location depends on the MCCH subframe starting location and the MCCH sending duration information, the determination of the subframe location comprises:

determine, according to the MCCH sending duration information, a quantity of subframes for the MCCH; and determine all subframes for the MCCH according to the quantity of subframes, the frame, a starting subframe, and a multimedia broadcast multicast service single frequency network (MBSFN) subframe configuration.

14. The base station apparatus according to claim 12, wherein the processing circuit is further configured to:

determine a subframe of an MCCH change notification is a starting subframe corresponding to the MCCH subframe starting location.

* * * * *